(12) United States Patent
Kakutani

(10) Patent No.: US 6,304,671 B1
(45) Date of Patent: Oct. 16, 2001

(54) IMAGE PROCESSING APPARATUS USING AN OFFSET CORRECTION TABLE ENABLING INTERPOLATION TO BE PERFORMED WITHOUT CONDITIONAL JUMPS

(75) Inventor: Toshiaki Kakutani, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/166,775

(22) Filed: Oct. 6, 1998

(30) Foreign Application Priority Data

Oct. 8, 1997 (JP) .................................................. 9-293524

(51) Int. Cl.[7] ...................................................... G06K 9/00
(52) U.S. Cl. ........................................... 382/167; 358/523
(58) Field of Search ................................. 382/162, 167; 358/1.9, 518, 520, 523, 524, 525; 345/131

(56) References Cited

U.S. PATENT DOCUMENTS

| | | | |
|---|---|---|---|
| 5,015,328 | * 5/1991 | Rudak | 382/167 |
| 5,121,196 | 6/1992 | Hung . | |
| 5,241,373 | 8/1993 | Kanamori et al. . | |
| 5,313,314 | 5/1994 | Ikegami . | |
| 5,390,035 | 2/1995 | Kasson et al. . | |
| 5,475,510 | 12/1995 | Ikegami . | |
| 5,581,376 | * 12/1996 | Harrington | 358/518 |
| 5,592,591 | * 1/1997 | Rolleston | 358/518 |
| 5,748,176 | * 5/1998 | Gondek | 345/131 |
| 5,748,195 | * 5/1998 | Nin | 358/523 |
| 5,926,559 | * 7/1999 | Ohta | 382/162 |

FOREIGN PATENT DOCUMENTS

| | | |
|---|---|---|
| 1 936 956 | 7/1970 | (DE) . |
| 32 22 662 | 1/1983 | (DE) . |
| 0 700 198 | 3/1996 | (EP) . |
| 2 104 337 | 3/1983 | (GB) . |
| 63-2669 | 1/1988 | (JP) . |
| 4-144481 | 5/1992 | (JP) . |
| 4-185075 | 7/1992 | (JP) . |
| 5110840 | of 1993 | (JP) . |

OTHER PUBLICATIONS

Patent Abstracts of Japan, vol. 014, No. 111 (P–1014), Feb. 28, 1990, JP 01 310405, Dec. 14, 1989.

A.W. Paeth, Proceedings of the SID, vol. 30, No. 3, pps, 169–175, "Algorithms For Fast Color Correction", Jan. 1, 1989.

J.M. Kasson et al., Journal of Electronic Imaging, vol. 4, No. 3, pp. 226–249, "Performing Color Space Conversions with Three–Dimensional Linear Interpolation", Jul., 1995.

* cited by examiner

Primary Examiner—Amelia M. Au
Assistant Examiner—Jingge Wu
(74) Attorney, Agent, or Firm—Oblon, Spivak, McClelland, Maier & Neustadt, P.C.

(57) ABSTRACT

The present invention realizes a high-speed data interpolation in a control method for controlling a predetermined plant. The present invention also provides an image processing apparatus that carries out color correction according to the control method. A table is provided to store data at respective lattice points that are discretely set in a coordinate space of a predetermined number of dimensions. The process first identifies a specific lattice division which is defined by some lattice points and in which input coordinates are included, and computes a base point of the specific lattice division and offset coordinates corresponding to a deviation from the base point. The process then refers to an offset correction table, which stores weighting coefficients and lattice point specification data used for interpolation, and reads the weighting coefficients and the lattice point specification data corresponding to the computed offset coordinates. The process subsequently multiplies the data corresponding to the lattice points specified by the lattice point specification data by the weighting coefficients and thereby interpolates the table. In the image processing apparatus, this table to be interpolated stores color correction data in a color space.

11 Claims, 23 Drawing Sheets

Fig. 12

| OFFSET COORDINATES | AD1 | AD2 | WK | WW | W1 | W2 |
|---|---|---|---|---|---|---|
| (0, 0, 0) | B | C | 1 | 0 | 0 | 0 |
| (0, 0, 1) | B | C | WK1 | WW1 | WB1 | WC1 |
| (0, 0, 2) | B | C | WK2 | WW2 | WB2 | WC2 |
| ⋮ | ⋮ | ⋮ | ⋮ | ⋮ | ⋮ | ⋮ |
| (0, 0, D) | B | C | 0 | 0 | 1 | 0 |
| (0, 1, 0) | G | C | WK3 | WW3 | WG1 | WC3 |
| ⋮ | ⋮ | ⋮ | ⋮ | ⋮ | ⋮ | ⋮ |
| (0, 1, D) | B | C | WK4 | WW4 | WB3 | WC4 |
| ⋮ | ⋮ | ⋮ | ⋮ | ⋮ | ⋮ | ⋮ |
| (0, D, D) | B | C | 0 | 0 | 0 | 1 |
| (1, 0, 0) | R | M | WK5 | WW5 | WR1 | WM1 |
| ⋮ | ⋮ | ⋮ | ⋮ | ⋮ | ⋮ | ⋮ |
| (1, D, D) | C | G | WK6 | WW6 | WC5 | WG2 |
| ⋮ | ⋮ | ⋮ | ⋮ | ⋮ | ⋮ | ⋮ |
| (D, D, D) | R | Y | 0 | 1 | 0 | 0 |

| | COORDINATES OF IMAGE DATA | OFFSET COORDINATE DATA |
|---|---|---|
| LATTICE POINT 0 → | 0 | 0 |
| | 1 | 1 |
| | 2 | 2 |
| | ⋮ | ⋮ |
| | 8 | 8 |
| | 9 | 9 |
| LATTICE POINT 1 → | 10 | 0 |
| | 11 | 1 |
| | ⋮ | ⋮ |
| | 19 | 9 |
| LATTICE POINT 2 → | 20 | 0 |
| | 21 | 1 |
| | ⋮ | ⋮ |

IMAGE PROCESSING APPARATUS USING AN OFFSET CORRECTION TABLE ENABLING INTERPOLATION TO BE PERFORMED WITHOUT CONDITIONAL JUMPS

BACKGROUND OF THE INVENTION

1. Field of the Invention

The present invention relates to a control method for carrying out a control operation of a plant by interpolating target data stored corresponding to specific points, which discretely exist in a coordinate space of a predetermined number of dimensions, according to combinations of coordinate values. The present invention also pertains to an image processing apparatus that carries out color correction of input image data by the control method applied thereto.

2. Description of the Related Art

Data interpolation has been adopted to control a variety of apparatuses. The data interpolation technique interpolates a table that stores predetermined data corresponding to discrete coordinates, and specifies data corresponding to a combination of arbitrary coordinates. The data interpolation technique is significantly effective for the data that can not be expressed by functions. Application of the data interpolation has another advantage, that is, reduction of the amount of data stored in a table. The data interpolation technique is applicable to carry out control operations of or more specifically color correction in an image processing apparatus that reads a color original with an image input unit, such as a scanner, and displays or reproduces the image data on an image output unit, such as a CRT, another display, and a color printer.

Image output apparatuses, such as a display and a color printer, have intrinsic color reproduction properties. Some techniques have been proposed to carry out color correction of a color image, which is input, for example, with a scanner, according to the color reproduction properties of the selected image output apparatus, in order to realize favorable color reproduction of the color image. The method described in JAPANESE PATENT LAID-OPEN GAZETTE No. 63-2669 is one of such color correction techniques. This method provides a color correction table corresponding to all the combinations of tones of three colors, red (hereinafter referred to as R), green (hereinafter referred to as G), and blue (hereinafter referred to as B). The color correction table stores the contents of color correction with respect to all the positions in a color space defined by three-dimensional coordinates. The image processing apparatus refers to this color correction table to implement color correction.

This prior color correction method, however, requires the extremely large storage capacity for the color correction table and is thereby not practical. By way of example, when input original color image data have 256 tones (=8 bits) for the respective colors R, G, and B, the number of colors is the third power of 256, which is approximately equal to 16,780 thousand colors. If the data after the color correction are 8-bit data, the storage capacity required for the color correction table is 48 megabyte for the three colors R, G, and B.

In order to reduce the storage capacity required for the color correction table, some proposed image processing methods divide a color space by a predetermined interval and provide color correction data only for lattice points obtained by the division. The techniques described in JAPANESE PATENT LAID-OPEN GAZETTE No. 4-144481 and No. 4-185075 carry out the image processing by data interpolation. These methods carry out interpolation with lattice point data and specify color correction data corresponding to the input image data that are deviated from any lattice points.

By way of example, a concrete procedure of data interpolation is discussed below with color correction data provided for eight lattice points that are present in the vicinity of the input image data in the three-dimensional color space. The eight lattice points represent vertexes of a cube or a lattice division defined by the lattice points adjoining to the input image data. Color correction data of the eight lattice points are expressed as $T(a,b,c), T(a+1,b,c), T(a,b+1,c), \ldots, T(a+1,b+1,c+1)$. Color correction data T corresponding to the input image data are then expressed as:

$$T = (1-\gamma a)(1-\gamma b)(1-\gamma c)T(a, b, c) +$$
$$\gamma a \cdot (1-\gamma b)(1-\gamma c)T(a+1, b, c) +$$
$$(1-\gamma a) \cdot \gamma b \cdot (1-\gamma c)T(a, b+1, c) +$$
$$(1-\gamma a)(1-\gamma b) \cdot \gamma c \cdot T(a, b, c+1) +$$
$$\gamma a \cdot \gamma b \cdot (1-\gamma c)T(a+1, b+1, c) +$$
$$\gamma a \cdot (1-\gamma b) \cdot \gamma c \cdot T(a+1, b, c+1) +$$
$$(1-\gamma a) \cdot \gamma b \cdot \gamma c \cdot T(a, b+1, c+1) +$$
$$\gamma a \cdot \gamma b \cdot \gamma c \cdot T(a+1, b+1, c+1)$$

where $\gamma a$, $\gamma b$, and $\gamma c$ denote weighting coefficients that are determined according to the distances between the input image data and the respective lattice points in the color space. Another method utilizes four lattice points in the vicinity of the input image data for interpolation. This method selects four among the vertexes of the lattice division for interpolation according to the position of the input image data in the lattice division.

This processing does not require the extremely large storage capacity for the color correction table. The interpolation gives color correction data with a relatively small error for each pixel, thereby assuring a favorable resulting image. Because of this advantage of reducing the required storage capacity, the technique of data interpolation is applied to control a variety of apparatuses.

Complicated arithmetic operations are, however, required for carrying out the control operation by the data interpolation technique and specifying data corresponding to a combination of arbitrary coordinates. For example, in the interpolation process with eight lattice points in the vicinity of the input image data, twenty-four multiplications and seven additions are required for interpolation of one color component with respect to each pixel. This means that an extremely large number of arithmetic operations are required for interpolation of all the color components with respect to all the pixels. Data interpolation is frequently repeated in the general image processing, so that the astronomically large number of arithmetic operations are required as a whole.

The contents of the processing for obtaining one piece of data become more complicated with an increase in number of dimensions of the table. By way of example, when the image processing apparatus carries out interpolation of three-dimensional data with four lattice points in the vicinity of the input image data, some conditional jumps are required to select four among the vertexes of the lattice division according to the positional relationship of the input image data. It is here assumed that eight lattice points K, R, G, B, C, M, Y, and W are present in the vicinity of the input image data in the three-dimensional color space of R, G, and B as shown in FIG. 1. The cube defined by these lattice points is divided into six tetrahedrons Tetra0 through Tetra5 shown in FIG. 1. In order to realize the interpolation with four lattice points, it is required to identify which of the six tetrahedrons the input image data belongs to, based on the magnitudes of the R component, the G component, and the B component of the input image data. The concrete procedure of the identification will be discussed later. The processing becomes more complicated with an increase in number of dimensions of the table that is to be interpolated.

Due to the above reason, the data interpolation requires an extremely long processing time. The time required for the image processing increases significantly because of an increase in number of pixels to realize the higher resolution of the output image. Although the processing speed of the CPU has been improved remarkably, this does not improve the image processing speed sufficiently. Such problems arise in a variety of other control operations, to which the data interpolation technique is applied.

SUMMARY OF THE INVENTION

One object of the present invention is thus to provide a high-speed data interpolation technique that is applied to the control operations of a variety of apparatuses. Another object of the invention is to apply the data interpolation technique to color correction and shorten the processing time required for the color correction without increasing the error of color correction.

At least part of the above and the other related objects is realized by a control method of carrying out a control operation of a plant by interpolating a parameter, which is related to the control operation of said plant, according to combinations of coordinates in a coordinate space of a predetermined number of dimensions, wherein values of the parameter are stored corresponding to lattice points that are present discretely in the coordinate space. The control method includes the steps of: (a) providing a lattice point information table, a target table of interpolation, and an offset correction table, wherein the lattice point information table stores lattice point information at respective lattice points specified by combinations of coordinates that are set discretely in respective dimensions of the coordinate space, the target table of interpolation stores the values of the parameter corresponding to the respective lattice points, and the offset correction table stores interpolation data, which are required for interpolating the target table of interpolation and specifying values corresponding to input data, corresponding to the offset coordinates; (b) receiving input data that represent a specific combination of coordinate values, which have been finitely set for the respective dimensions in the coordinate space; (c) identifying a specific lattice division in which the input data is included, among a plurality of lattice divisions defined by adjoining lattice points in the respective dimensions of the coordinate space, based on the lattice point information; (d) converting the input data into coordinates of a reference lattice point, which represents a base point among lattice points constituting the specific lattice division, and offset coordinates, which represent a deviation of the input data from the coordinates of the reference lattice point in the respective dimensions; and (e) reading interpolation data corresponding to the offset coordinates from the offset correction table, reading values of the parameter corresponding to the reference lattice point and predetermined lattice points adjoining to the reference lattice point from the target table of interpolation, and carrying out interpolation of the parameter with the interpolation data.

The control method of the present invention adopts the data interpolation technique that converts the input data into the coordinates of the reference lattice point of the specific lattice division, which the input data belongs to, and the offset coordinates, and interpolates the target table of interpolation, which stores data corresponding to the respective lattice points. An offset correction table is provided to store interpolation data corresponding to the offset coordinates. The method refers to the offset correction table and readily obtains the interpolation data. Whereas the conventional technique carries out the interpolation through complicated conditional jumps according to the offset coordinates, this method realizes the interpolation simply by referring to the offset correction table. This arrangement naturally decreases the amount of arithmetic operations required for interpolation. The data interpolation technique thus significantly improves the processing speed for interpolation without increasing the error of interpolation, thereby enhancing the speed of the whole control operations.

The control method of the present invention may be realized in a variety of applications discussed below.

In accordance with a first application of the control method, the plant is an image processing apparatus that carries out color correction of color data of an image. The input data includes color data representing a color expressed in a first color system as a combination of tones in a color space of at least two dimensions. The target table of interpolation stores colors expressed in a second color system that is different from the first color system, at the respective lattice points.

This application enables the high-speed color correction that converts the color components of the input image data into color components expressed in another color system. One possible example of color correction converts the color components expressed in the three-dimensional color space of R, G, and B into the color components expressed in a color system of cyan, magenta, yellow, and black.

In accordance with a second application of the control method, the input data includes a combination of parameters relating to a driving state of the predetermined apparatus. The target table of interpolation stores values of a parameter, which relates to a control quantity of the predetermined apparatus, at the respective lattice points.

A variety of variables can be used as parameters relating to the driving state and parameters relating to the quantity of control, according to the plant or the apparatus to be controlled. For example, when the plant is a jet engine, the altitude and the speed of the jet engine and the throttle rating may be selected as the parameters relating to the driving state, while the thrust may be used as the parameter relating to the quantity of control. These parameters are correlated with one another. In another example, the altitude, the speed, and the thrust are selected as the parameters relating to the driving state, whereas the throttle rating is selected as the parameter relating to the quantity of control.

The plant or the object to be controlled may be any machines and apparatuses including a variety of engines, transport equipment, and industrial machinery. The plant may be electric circuits and optical systems as well as mechanically-driven apparatuses. The second application of the control method is applicable not only to control the apparatuses but to simulate the operations of these apparatuses.

In accordance with a third application of the present invention, the control method is applied for fuzzy control of the plant. In this case, the input data includes a parameter representing a state quantity relating to the fuzzy control. The target table of interpolation stores membership values at the respective lattice points.

The fuzzy control is a control logic based on a fuzzy parameter including uncertainty. One example is control of the vehicle speed. The fuzzy control carries out the control like 'accelerate in the case of the slow vehicle speed'. This fuzzy control does not make the vehicle speed coincident with a specific velocity but utilizes the fuzzy parameter of 'slow' for the control. The function that mathematically expresses such a fuzzy parameter is called the membership function, and the values of the function are called the membership values. In the process of the control with the fuzzy parameter of 'slow', the membership function gives the real numbers of 0 to 1.0 as the probability of recognition 'slow' against the vehicle speed.

The fuzzy control interpolates the membership function stored in the form of a table according to the state quantity relating to the control, so as to determined the control quantity. The interpolation of the membership function is frequently carried out in the fuzzy control. Application of the control method of the present invention to the interpolation of the membership function accordingly realizes the extremely high-speed fuzzy control.

In accordance with a fourth application of the present invention, the control method is applied to implement coordinates conversion of data expressed in a first coordinate system into data expressed in a second coordinate system that is different from the first coordinate system. In this case, the input data includes a combination of coordinates in the first coordinate system. The target table of interpolation stores coordinates in the second coordinate system at the respective lattice points.

This arrangement enables the high-speed coordinates conversion. A variety of coordinate systems may be selected for the first and the second coordinate systems. For example, a three-dimensional orthogonal coordinate system (x,y,z) is selected as the first coordinate system, and a three-dimensional polar coordinate system (r,θ,φ) as the second coordinate system. Conversion of the orthogonal coordinate system into the polar coordinate system is carried out by Equations (1) including square roots and trigonometric functions as given below. The square roots and the trigonometric functions take a relatively long time.

$$r = \sqrt{(x \times x + y \times y + z \times z)}$$

$$\theta(\text{rad}) = \cos^{-1}(x/\sqrt{(x \times x + y \times y)})$$

$$\phi(\text{rad}) = \cos^{-1}(z/\sqrt{(x \times x + y \times y + z \times z)}) \quad (1)$$

These arithmetic operations convert, for example, points A (1,0,0) and B (1,1,0) in the first coordinate system into:

A: (1,0,0)→Ap: (r,θ,φ)=(1,0,π/2)

B: (1,1,0)→Bp: (r,θ,φ)=(√2,π/4,π2)

In the process of coordinates conversion, to which the fourth application of the control method is applied, coordinates in the first coordinate system and coordinates in the second coordinate system with respect to a plurality of representative points are stored in the form of a table. The coordinates conversion is carried out by interpolating this table. A point C (1,0.5,0) that is located in the middle of the points A and B in the first coordinate system is converted into coordinates in the second coordinate system ny interpolating the coordinates of the points Ap and Bp. The fourth application of the control method implements the high-speed interpolation and realizes the high speed conversion of the first coordinate system into the second coordinate system, thereby enhancing the speed of the whole control operations.

In the case where the orthogonal coordinate system and the polar coordinate system are respectively selected for the first coordinate system and the second coordinate system, the coordinates conversion is not linear and includes some error. The error is varied according to the interval of the lattice points included in the target table of interpolation. It is thus desirable to set the lattice point interval in the target table of interpolation to the value that enables the error of coordinates conversion to be within an allowable range.

In the fourth application discussed above, a variety of other coordinate systems may be selected for the first coordinate system and the second coordinate system. As long as the second coordinate system is unequivocally mapped to the first coordinate system, these coordinate systems may have different numbers of dimensions. By way of example, the fourth application of the control method may be applied to conversion that projects the coordinates expressed in a three-dimensional orthogonal coordinate system onto the plane expressed in a two-dimensional orthogonal coordinate system.

In accordance with a fifth application of the present invention, the control method is applied to implement linear conversion of data expressed in a first coordinate system into data expressed in a second coordinate system that is different from the first coordinate system. In this case, the input data includes a combination of parameters that specify the linear conversion. The target table of interpolation stores coefficients, by which the data expressed in the first coordinate system are multiplied.

This arrangement enables the extremely high-speed linear conversion of the coordinates. One typical example of linear conversion is rotation of the coordinates. In this case, the rotational angle of the coordinates is selected as the parameter that specifies linear conversion. By way of example, coordinates (xe,ye,ze) in a first orthogonal coordinate system of Xe, Ye, and Ze axes are converted into coordinates (xb,yb,zb) in a second orthogonal coordinate system of Xb, Yb, and Zb axes. As illustrated in FIG. 33, the procedure sequentially rotates the first orthogonal coordinate system about the Ze axis by ψ (rad), about the Ye axis by θ(rad), and about the Xe axis by φ (rad) to implement conversion into the second orthogonal coordinate system. The angles ψ, θ, and φ relate to coordinates conversion and are generally referred to as Euler angles. Such linear conversion is implemented by multiplying the coordinates in the first coordinate system by a 3×3 conversion matrix according to Equations (2) given below. The nine elements a11 through a33 of the conversion matrix are specified according to the Euler angles.

$$xb = \sin\theta\cos\psi \cdot xe + (-\sin\theta\sin\psi) \cdot ye + \cos\theta \cdot ze \quad (2)$$
$$= a11 \cdot xe + a12 \cdot ye + a13 \cdot ze;$$

$$yb = (-\sin\phi\cos\theta\cos\psi + \cos\phi\sin\psi) \cdot xe +$$
$$(-\sin\phi\cos\theta\sin\psi + \sin\phi\cos\psi) \cdot ye + \sin\phi\sin\theta \cdot ze$$
$$= a21 \cdot xe + a22 \cdot ye + a23 \cdot ze;$$

$$zb = (\cos\phi\cos\theta\cos\psi + \sin\phi\sin\psi) \cdot xe +$$
$$(-\cos\phi\cos\theta\sin\psi + \sin\phi\cos\psi) \cdot ye + (-\cos\phi\sin\theta) \cdot ze$$
$$= 31 \cdot xe + a32 \cdot ye + a33 \cdot ze;$$

In the coordinates conversion, to which the fifth application of the control method is applied, the target table of interpolation stores the nine elements a11 through a33 corresponding to various combinations of the Euler angles ψ, θ, and φ. The procedure interpolates the target table of interpolation and specifies the nine elements a11 through a33 corresponding to a specific combination of the Euler angles. The fifth application of the control method implements the high-speed interpolation and realizes the high-speed coordinates conversion, thereby enhancing the speed of the whole control operations. The data interpolation of the fifth application is applicable to conversion of coordinates of various numbers of dimensions and to coordinate systems other than the orthogonal coordinate system.

As discussed in the first application, the control method of the present invention is applicable to control the image processing apparatus and carry out the color correction of image data. The control method of the present invention is especially effective in such image processing operations since an extremely large amount of data are to be processed. The present invention may be constructed as an image processing apparatus, to which the control method is applied, as discussed below.

The present invention is accordingly directed to an image processing apparatus that carries out color correction of a multi-color image and outputs the color-corrected image, the multi-color image being expressed by coordinates that correspond to predetermined numbers of tones in respective dimensions in a color space of at least two dimensions. The image processing apparatus includes: an input unit that inputs color image data specified by a specific combination of coordinates with respect to each pixel included in the multi-color image; a first memory that stores lattice point information in the form of a lattice point information table, wherein the lattice point information includes coordinates of lattice points that are obtained by dividing the color space by a predetermined number, which is smaller than a number of tones in each dimension; a second memory that stores color correction data, which relate to a quantity of color correction, corresponding to each lattice point in the form of a color correction table; a lattice division identification unit that identifies a specific lattice division in which the color image data is included, among a plurality of lattice divisions defined by adjoining lattice points in the respective dimensions of the color space, based on the lattice point information; an image data conversion unit that converts the color image data into coordinates of a reference lattice point, which represents a base point among lattice points constituting the specific lattice division, and offset coordinates, which represent a deviation of the color image data from the coordinates of the reference lattice point in the respective dimensions; a third memory that stores interpolation data, which are required for interpolating the color correction table and specifying color correction data corresponding to the color image data, corresponding to the offset coordinates in the form of an offset correction table; and a color correction unit that reads interpolation data corresponding to the offset coordinates from the offset correction table, reads color correction data corresponding to the reference lattice point and predetermined lattice points adjoining to the reference lattice point from the color correction table, carries out interpolation of the color correction data with the interpolation data, and outputs a result of the interpolation as corrected color image data.

Based on the functions discussed in the data interpolation technique that is applied to the control method of the present invention, the image processing apparatus of this configuration realizes the high-speed interpolation of the color correction table without increasing the error of interpolation and thereby improves the image processing speed.

Example of the color space of at least two dimensions include a color space of R, G, and B, a color space of C, M, and Y, and color spaces expressed in the XYZ color system, the L*a*b* color system, the L*C*h color system, and the Munsell color system. When the coordinates are expressed by n-bit digital data, the number of tones is generally the n-th power of 2 (for example, 256 tones in the case of 8-bit data). The number of tones is, however, not restricted to the n-th power of 2, and 100 tones, 17 tones, and the other numbers of tones are also available.

The lattice points are obtained as intersections when the color space is divided into predetermined numbers that are smaller than the numbers of tones in the respective dimensions. It is not necessary that the interval of the division is constant. Namely it is not required to divide a low density area and a high density area in each dimension by an identical interval. It is also not required to divide the respective dimensions by an identical interval. By way of example, a specific dimension (for example, the direction R in the color space of R, G, and B) is divided by a fixed interval whereas the other dimensions (for example, the directions G and B) are divided by varying intervals. The respective dimensions may have different numbers of divisions. It is desirable to use a common offset correction table for the whole color space, but a plurality of offset correction tables may be provided according to the division of the color space.

In accordance with one application of the image processing apparatus, it is desirable that the division of the color space causes an amount of the color correction data stored as the color correction table to be substantially equal to an amount of the interpolation data stored as the offset correction table.

Such division of the color space substantially minimizes the sum of the storage capacity required for the color correction data and the storage capacity required for the interpolation data. This effect is discussed in detail in an example where an n-dimensional color space having L tones with respect to each dimension is divided by equal intervals. In this example, all the lattice divisions are identical and a common offset correction table is applicable to the whole color space. In the case where the color space is divided by an interval of m tones, the color space is divided into (L/m) divisions for each dimension. The amount of data is expressed by Equation (3) given below, when A pieces of color correction data are provided for each lattice point:

$$\text{Amount of Color Correction Data} = A \cdot (L/m)\hat{\ }n \qquad (3)$$

where ˆ denotes a power operator.

When B pieces of offset correction data are provided corresponding to m coordinate values with respect to each dimension included in the lattice division, the amount of data is expressed by Equation (4) given below:

$$\text{Amount of Offset Correction Data} = B \cdot m\hat{\ }n \qquad (4)$$

The total amount of data is calculated as the sum of Equations (3) and (4) and is subjected to arithmetic and geometric means, which is a well-known mathematical theorem. This gives the relationship of Expression (5):

$$\text{Total Amount of Data} = A \cdot (L/m)\hat{\ }n + B \cdot m\hat{\ }n$$
$$\geq 2\sqrt{(A \cdot (L/m)\hat{\ }n \cdot B \cdot m\hat{\ }n)}$$
$$= 2\sqrt{(A \cdot B)} \cdot \sqrt{(L\hat{\ }n)} \qquad (5)$$

According to the theorem of arithmetic and geometric means, the total amount of data is equal to the minimum value $2\sqrt{(A \cdot B) \cdot \sqrt{(L^n)}}$ of Expression (5), when the two terms of the arithmetic means, that is, $A \cdot (L/m)^n$ (the amount of color correction data) and $B \cdot m^n$ (the amount of offset correction data), are identical with each other. This means that the equal amounts of color correction data and offset correction data minimize the required storage capacity. The interval of division m in the color space that minimizes the storage capacity is given by solving the equation of:

$$A \cdot (L/m)^n = B \cdot m^n$$

The root mx of the equation is expressed as:

$$mx = (A \cdot L^n/B)^{(1/2n)}$$

The numbers of tones L and m and the number of dimensions n of the color space are all integers, whereas the root mx of the equation may not be integral. It is thus difficult to hold the relationship that the amount of color correction data is strictly identical with the amount of offset correction data, that is, the relationship of the number of tones m=mx. The number of tones is often expressed by bits, and it is thus desirable to hold the relationship of $m=2^X$, where X is an integer. Even if the amount of color correction data is not strictly equal to the amount of offset correction data, the division of the color space that makes the amounts substantially equal to each other substantially minimizes the storage capacity required for these data. More concretely, the number of tones m is determined to satisfy the condition of $2^X$, where X is an integer, in the range of $mx/2 \leq m \leq 2 \cdot mx$. In the case where the number of color correction data A per lattice point is substantially equal to the number of offset correction data B per coordinate point, if the color space has the N-bit tones with respect to each dimension, the interval of the division m set equal to (N/2) bits minimizes the total amount of data.

When the color space is a three-dimensional color space, it is desirable that the interpolation data stored in the offset correction table includes lattice point specification data and weighting coefficient data. The lattice point specification data specifies at least part of four lattice points used for interpolation, according to the offset coordinates. The weighting coefficient data are determined according to the offset coordinates and color correction data corresponding to the four lattice points are multiplied by the weighting coefficient data.

This arrangement enables the offset correction table to be applied to interpolation with four points including a reference lattice point (hereinafter referred to as the tetrahedral interpolation). As is known, the tetrahedral interpolation minimizes the amount of arithmetic operations in the three-dimensional color space. The tetrahedral interpolation required selection of four lattice points used for interpolation according to the offset coordinates. The offset coordinate table of the above structure stores at least part of the lattice points as the lattice point specification data. The method thus easily selects the lattice points by simply referring to this table. This arrangement facilitates the selection of the lattice points and realizes the extremely high-speed image processing in the three-dimensional color space. The color correction data may be multiplied directly by the weighting coefficient data or by coefficients calculated from the weighting coefficient data.

When the color space is divided by varying intervals, it is desirable that the image processing apparatus further includes a normalizing unit that normalizes the coordinates, in order to equalize intervals between adjoining lattice points in each dimension. The image data conversion unit converts the color image data into the coordinates of the reference lattice point, which represents the base point among the lattice points constituting the specific lattice division, and the offset coordinates, which represent the deviation of the color image data from the coordinates of the reference lattice point in the respective dimensions by the coordinates normalized by the normalizing unit.

The offset correction table is provided for the lattice divisions defined by the virtual lattice point interval. This table is applicable to all the lattice divisions. This arrangement enables a common offset correction table to be used for the whole color space that is divided by varying intervals, and thereby reduces the storage capacity required for the interpolation data. This structure does not require selection of an appropriate offset correction table according to the lattice division, which includes the input color image data, through conditional jumps, thereby attaining the high-speed image processing.

In order to minimize the error of color correction, it is desirable that the virtual lattice point interval is made coincident with the major interval among a plurality of lattice point intervals applied for the division of the color space. By way of example, it is assumed that the color space is divided by an interval 'a' and an interval 'b'. When the lattice point interval 'a' occupies 90% and the lattice point interval 'b' has only the remaining 10%, it is preferable that the virtual lattice point interval is set equal to the interval 'a'. It is, however, not necessary that the virtual lattice point interval coincides with any one of the lattice point intervals, but the virtual lattice point interval may be specified arbitrarily. In accordance with one preferable application, the virtual lattice point interval is set to be a little smaller than the lattice point interval, in order to reduce the storage capacity required for the offset correction table.

When the image processing apparatus has the normalizing unit, it is desirable that the interval between adjoining lattice points after the normalization is an integral multiple of the interval between adjoining lattice points before the normalization in a predetermined low density area of the color space.

This structure effectively prevents the deterioration of the picture quality due to the error arising in the process of interpolating the color correction data through normalization. The color image data have an integral coordinate corresponding to a predetermined number of tones with respect to each dimension of the color space. When the normalizing unit carries out the coordinates conversion in the color space that is divided by varying lattice point intervals, the color image data may not have integral coordinates. The offset correction table is provided corresponding to the integral coordinates. It is accordingly required to round the color image data after the coordinates conversion to a whole number. This causes a rounding error. The coordinates conversion and the rounding process are collectively referred to as the normalization process. As described previously, the error may lower the picture quality in the low density area. The above preferable arrangement causes the ratio of the virtual lattice point interval to the lattice point interval to be an integer in the low density area of the color space. This effectively prevents the rounding error in the normalization process and ensures the high picture quality.

The low density area of the present invention does not mean the area where the output image has light colors, but represents the area having a low density of dots output to the image output apparatus. For example, in the case where the resulting image is eventually output to an ink jet printer that expresses the tones by the dot on-off state, the low density area represents the area having a low dot density of the inks C, M, and Y. In the case where the output apparatus is a CRT, the low density area may be an area where white dots are sparsely dispersed (that is, a dark color area) when the attention is given to the white dots, or an area where black dots are sparsely dispersed (that is, a light color area) when the attention is given to the black dots. In the printer that has a high-density ink and a low-density ink for an identical color and records both deep dots and light dots, the low density area of the ink includes not only an area where light dots are sparsely dispersed (a light color area) but an area where deep dots are sparsely dispersed (a dark color area).

In the image processing apparatus having the normalizing unit, in accordance with one preferable application, image data conversion unit has at least one of: a reference lattice point table that stores the coordinates of the reference lattice point, which represents the base point among the lattice points constituting the specific lattice division, according to the color image data; and an offset coordinate table that stores the offset coordinates, which represent the deviation of the color image data from the coordinates of the reference lattice point in the respective dimensions by the coordinates normalized by the normalizing unit, according to the color image data. The image data conversion unit carries out at least one of the conversion of the color image data into the coordinates of the reference lattice point and the conversion of the color image data into the offset coordinates by referring to at least one of the reference lattice point table and the offset coordinate table.

The normalization process requires rather complicated arithmetic operations and may interfere with the high-speed image processing. By way of example, the coordinate of the input color image data with respect to each dimension is successively compared with the coordinates of the lattice points, in order to identify the lattice division in which the color image data is included. The rounding process is also required to round each coordinate to a whole number, in order to give the normalized offset coordinates. This preferable arrangement executes the normalization process by simply referring to the reference lattice point table and the offset coordinate table, thereby enabling the high-speed image processing.

In order to attain the high-speed processing, it is desirable that the image data conversion unit has both the reference lattice point table and the offset coordinate table. The image data conversion unit may, however, have either one of these tables according to the marginal storage capacity. Although it is preferable that these tables are provided for all the dimensions of the color space, they may be provided for only part of the dimensions or may be used in common for a plurality of dimensions.

The present invention may be realized by a computer readable recording medium on which a computer program is recorded. The present invention is thus directed to a first computer readable recording medium, on which a program for causing a computer to realize image processing is recorded, wherein the image processing carries out color correction of a multi-color image and outputs the color-corrected image, the multi-color image being expressed by coordinates that correspond to predetermined numbers of tones in respective dimensions in a color space of at least two dimensions. The program causes the computer to realize the functions of: inputting color image data specified by a specific combination of coordinates with respect to each pixel included in the multi-color image; referring to a lattice point information table that stores lattice point information with respect to the color space, wherein the lattice point information includes coordinates of lattice points that are obtained by dividing the color space by a predetermined number, which is smaller than a number of tones in each dimension; referring to a color correction table that stores color correction data, which relate to a quantity of color correction, corresponding to each lattice point; identifying a specific lattice division in which the color image data is included, among a plurality of lattice divisions defined by adjoining lattice points in the respective dimensions of the color space, based on the lattice point information; converting the color image data into coordinates of a reference lattice point, which represents a base point among lattice points constituting the specific lattice division, and offset coordinates, which represent a deviation of the color image data from the coordinates of the reference lattice point in the respective dimensions; referring to an offset correction table that stores interpolation data, which are required for interpolating the color correction table and specifying color correction data corresponding to the color image data, corresponding to the offset coordinates; and reading interpolation data corresponding to the offset coordinate from the offset correction table, reading color correction data corresponding to the reference lattice point and predetermined lattice points adjoining to the reference lattice point from the color correction table, carrying out interpolation of the color correction data with the interpolation data, and outputting a result of the interpolation as corrected color image data.

The computer executes the program recorded on such a recording medium and realizes the respective functions described above, thereby implementing the image processing. Available examples of the recording media include flexible disks, CD-ROMs, magneto-optic discs, IC cards, ROM cartridges, punched cards, prints on which bar codes and other codes are printed, internal storage devices (memories like RAM and ROM) and external storage devices of the computer, and a variety of other computer readable media. The present invention may be constructed as a program supply apparatus that supplies the computer program, which causes the computer to realize the respective steps or functions of the present invention discussed above, via a communication path.

The present invention is also directed to a second computer readable recording medium for recording data used in an image processing apparatus. The image processing apparatus carries out color correction of a multi-color image with specific data and outputs the color-corrected image, wherein the multi-color image is expressed by coordinates that correspond to predetermined numbers of tones in respective dimensions in a color space of at least two dimensions, and the specific data are provided corresponding to specific lattice points selected among a plurality of lattice points obtained by dividing the color space. A lattice point information table that stores lattice point information with respect to the color space, wherein the lattice point information includes coordinates of the plurality of lattice points that are obtained by dividing the respective dimensions of the color space by a predetermined number, which is smaller than a predetermined number of tones in each dimension; a color correction table that stores color correction data, which relate to a quantity of color correction, corresponding to each lattice point; and an offset correction table that stores interpolation data, which are required for interpolating the color correction table and specifying color correction data corresponding to color image data, corresponding to offset coordinates, wherein the offset coordinates represent a deviation of the color image data from coordinates of a reference lattice point in the respective dimensions, and the reference lattice point represents a base point of a specific lattice division that is defined by lattice points adjoining to the color image data in the respective dimensions of the color space are recorded on the computer readable recording medium.

As described previously, the image processing apparatus of the present invention carries out the color correction of the color image data by taking advantage of the lattice point information table, the color correction table, and the offset correction table. When the data in these tables are provided in the form of the second recording medium, the computer reads the required data and realizes the functions of the image processing apparatus.

Among the tables recorded on the second recording medium, the offset correction table has an unique data structure, which is proposed for the first time by the applicants of the present invention in the field of the image processing. Although the lattice point information table and the color correction table have been conventionally used for the image processing, these tables are closely related to the data in the offset correction table. The data recorded on the second recording medium of the present invention are thus not the conventional data but the unique data having the special data structure, which is the most characteristic of the present invention.

In the second recording medium, it is preferable that an amount of the color correction data stored as the color correction table is substantially equal to an amount of the interpolation data stored as the offset correction table. As described previously, the substantially identical amounts of data favorably minimize the total storage capacity required for the color correction table and the offset correction table. The structure of the second recording medium can effectively utilize the media having a relatively small storage capacity, such as flexible disks.

These and other objects, features, aspects, and advantages of the present invention will become more apparent from the following detailed description of the preferred embodiments with the accompanying drawings.

BRIEF DESCRIPTION OF THE DRAWINGS

FIG. 12 shows an offset correction table OT as an example;

DESCRIPTION OF THE PREFERRED EMBODIMENTS

Figure 1:
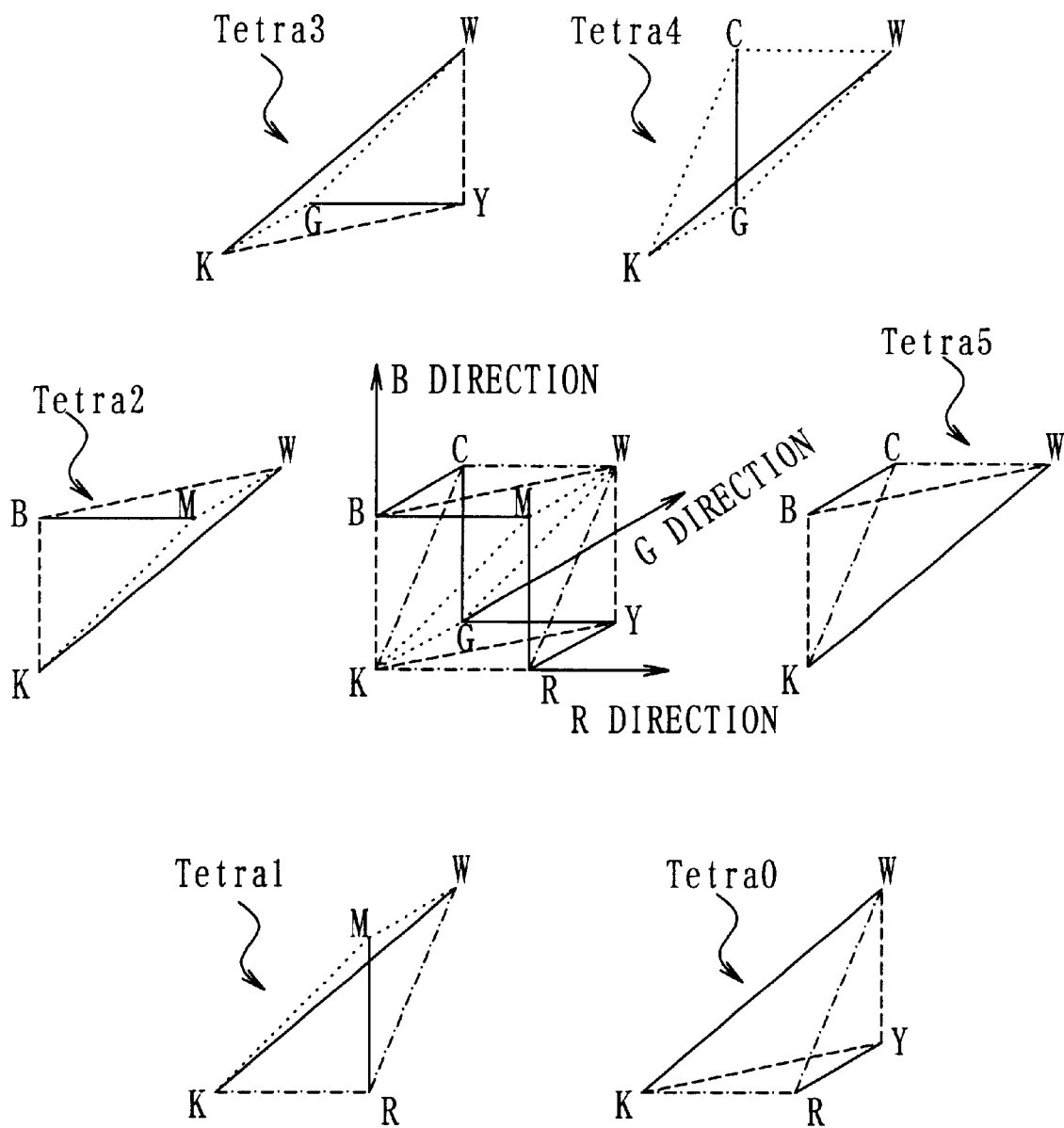
FIG. 1 shows the tetrahedrons used for interpolation corresponding to various positions of the color image data.
Figure 2:
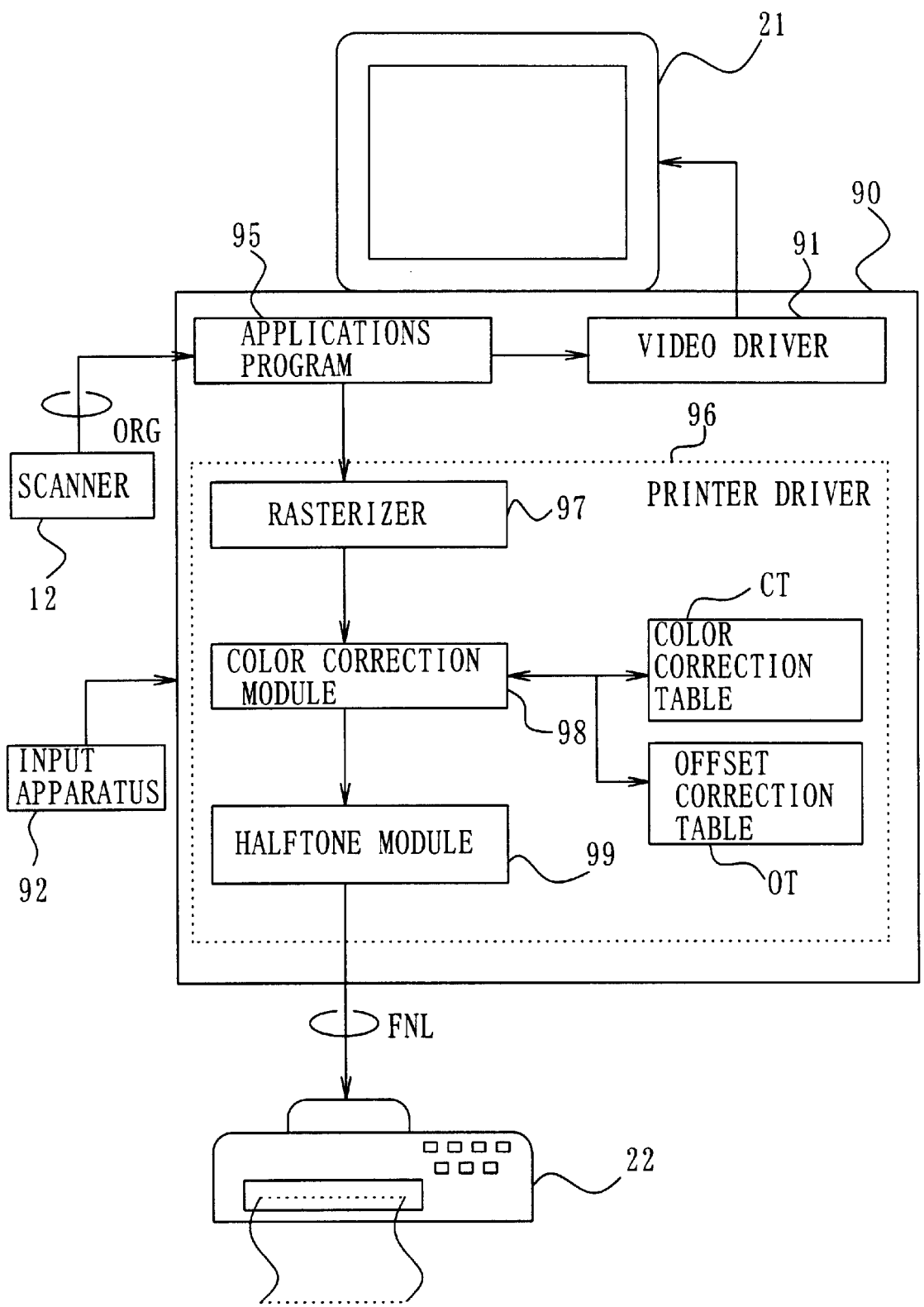
FIG. 2 is a block diagram illustrating the structure of a color image processing system with a color image processing apparatus embodying the present invention.

The following describes application of a data interpolation apparatus of the present invention to a color image processing apparatus. FIG. 1 shows outline of a method for interpolating color correction data carried out by a color image processing apparatus embodying the present invention. FIG. 2 is a block diagram illustrating the structure of a color image processing system with the color image processing apparatus of the embodiment incorporated therein.

A. Structure of Image Output Apparatus

For convenience of explanation, the general structure of the color image processing system is described first with the block diagram of FIG. 2. The color image processing system includes a scanner 12 functioning as an image input apparatus, a personal computer 90, and a color printer 22 functioning as an image output apparatus. The personal computer 90 is provided with a color display 21 and an input unit 92 including a keyboard and a mouse. The scanner 12 as the image input apparatus reads original color image data ORG from a color original and supplies the original color image data ORG, which consists of three color components R, G, and B, to the computer 90.

In this embodiment, the respective colors R, G, and B are expressed by 8-bit digital data and have the number of tones equal to 256. The color of each pixel is expressed as coordinate values that represent the position in a three-dimensional color space defined by coordinate axes of the respective colors R, G, and B. In general, the color of each pixel can be expressed as coordinate values that represent the position in the color space, to which any color coordinate system, such as an L*a*b* systems is application. The computer 90 functioning as the image processing apparatus inputs the coordinates of each pixel expressed in this manner as color image data. Any available means other than the scanner 12, for example, a video camera or a host computer for computer graphics, may be used for the input of color image data.

The following describes the structure of the computer 90 constructing the image processing apparatus. The computer 90 includes a CPU, a RAM, and a ROM, which are not specifically illustrated herein. An applications program 95 runs under a predetermined operating system. The CPU used in this embodiment is Pentium II (registered trade mark by Intel Corp). A video driver 91 and a printer driver 96 are incorporated in the operating system, and final color image data FNL are output from the applications program 95 via these drivers 91 and 96. The applications program 95 reads an image with the scanner 12, causes the input image to be subjected to a predetermined processing operation, for example, retouch of the image, and displays a processed image on the CRT display 21 via the video driver 91. When the applications program 95 issues a printing instruction, the printer driver 96 in the computer 90 receives image information from the applications program 95 and converts the input image information to signals printable by the printer 22 (binarized signals for the respective colors C, M, and Y).

In the example of FIG. 2, the printer driver 96 includes a rasterizer 97 that converts the color image data processed by the applications program 95 into dot-based image data, a color correction module 98 that causes the dot-based image data to be subjected to color correction according to the ink colors C, M, and Y used by the image output apparatus (the printer 22 in this embodiment) and the calorimetric characteristics of the printer 22, and a color correction table CT and an offset correction table OT referred to by the color correction module 98. The printer driver 96 is further provided with a halftone module 99 that generates halftone image data, which express the density in a specific area by the existence or non-existence of ink in each dot unit, from the color-corrected image data.

The computer 90 performs color correction and tone number conversion as the image processing operations that make the input original color image data ORG suited for the color reproduction properties of the image output apparatus, such as the printer 22. The color correction, for example, gamma correction, corrects the color to be suited for the output characteristics of the image output apparatus. The tone number conversion converts the color image data into the number of tones that can be output by the image output apparatus, when the number of tones that can be output from the image output apparatus, such as the printer 22, is smaller than the number of tones included in the original color image data ORG. In this embodiment, the image data ORG read with the scanner 12 has 256 tones (corresponding to 8 bits) for each of the colors R, G, and B, whereas the printer 22 is an ink-jet printer that can output only two tones by the on-off states of ink. The computer 90 accordingly converts the image data of 256 tones into two tones and outputs the converted data as the final color image data FNL to the image output apparatus, such as the printer 22. In addition to the printer 22, the color display 21 may be used as the image output apparatus. The data interpolation apparatus of the present invention described herein is realized by the color correction module 98, the color correction table CT, and the offset correction table OT illustrated in FIG. 2 and a non-illustrated data input-output unit connecting with the color correction module 98.

Figure 3:
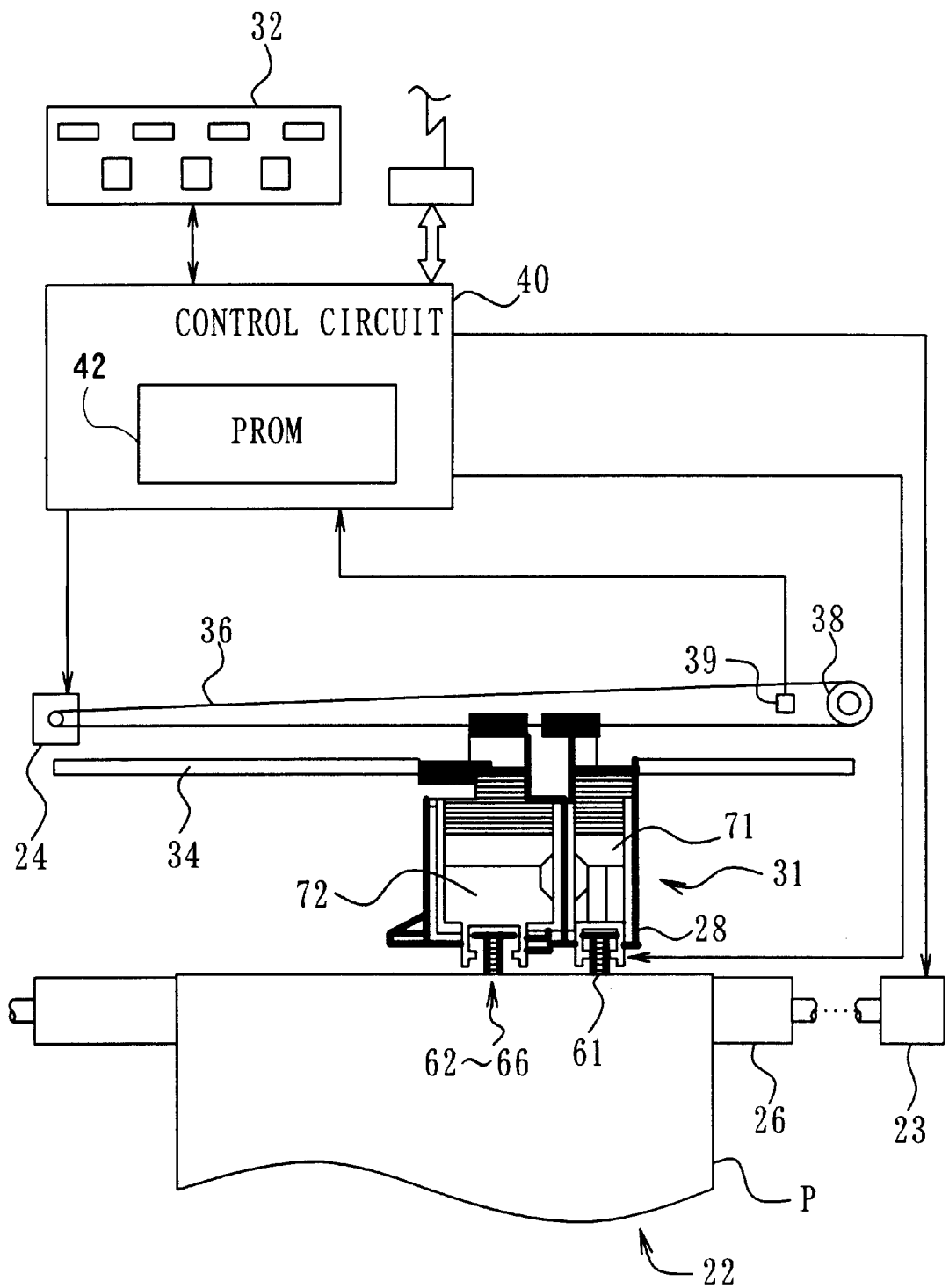
FIG. 3 schematically illustrates the structure of a printer included in the image processing system.

The following briefly describes the structure of the printer 22 as the image output apparatus. FIG. 3 schematically illustrates the structure of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and formation of dots, and a control circuit 40 for transmitting signals to and from the sheet feed motor 23, the carriage motor 24, the print head 28, and a control panel 32.

A black ink cartridge 71 and a color ink cartridge 72 for storing three color inks, that is, cyan (hereinafter referred to as C), magenta (hereinafter referred to as M), and yellow (hereinafter referred to as Y), may be mounted on the carriage 31 of the printer 22. Four ink discharge heads 61 through 64 are formed on the print head 28 that is disposed in the lower portion of the carriage 31, and ink supply conduits 65 (see FIG. 4) are formed in the bottom portion of the carriage 31 to feed supplies of ink from ink tanks to the respective ink discharge heads 61 through 64. When the black ink cartridge 71 and the color ink cartridge 72 are attached downward to the carriage 31, the ink supply conduits 65 are inserted into connection apertures (not shown) formed in the respective cartridges. This enables supplies of ink to be fed from the respective ink cartridges to the ink discharge heads 61 through 64.

Figure 4:
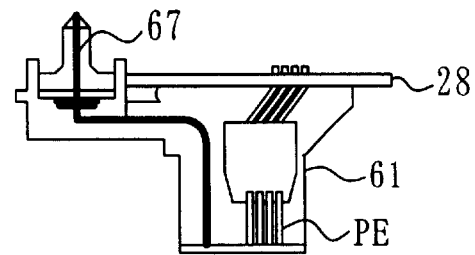
FIG. 4 shows the structure of a print head for recording dots mounted on the printer of the embodiment.
Figure 4:
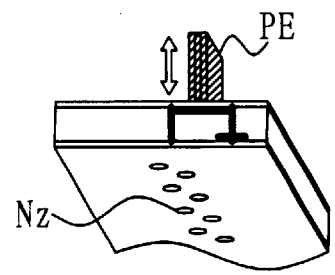

The following briefly describes the mechanism of discharging ink. When the ink cartridges 71 and 72 are attached to the carriage 31, supplies of ink in the ink cartridges 71 and 72 are sucked out by capillarity through the ink supply conduits 65 and are led to the ink discharge heads 61 through 64 formed in the print head 28 arranged in the lower portion of the carriage 31 as shown in FIG. 4. In case that the ink cartridges 71 and 72 are attached to the carriage 31 for the first time, a pump works to suck first supplies of ink into the respective ink discharge heads 61 through 64. In this embodiment, structures of the pump for suction and a cap for covering the print head 28 during the suction are not illustrated nor described specifically.

Figure 5:
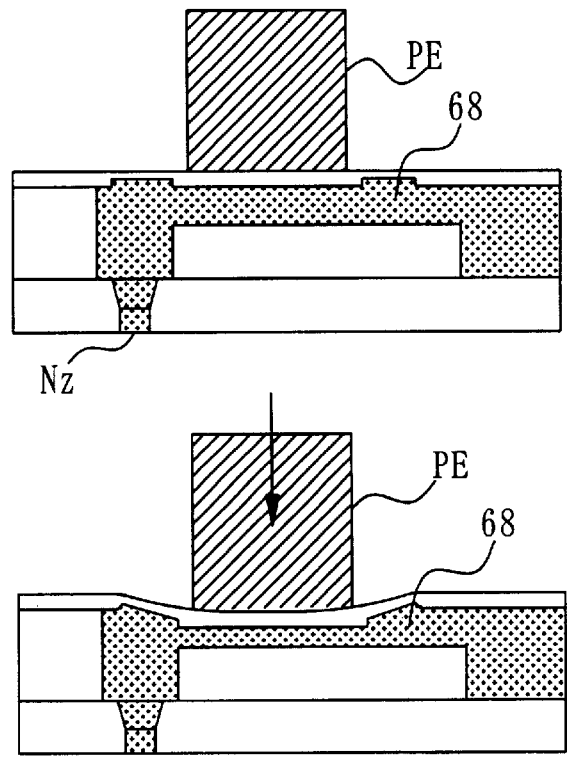
FIG. 5 shows the principle of dot formation in the printer of the embodiment.

An array of thirty-two nozzles Nz is formed in each of the ink discharge heads 61 through 64 as shown in FIG. 4. A piezoelectric element PE, which has an excellent response and is one of electrically distorting elements, is arranged for each nozzle Nz. FIG. 5 illustrates a configuration of the piezoelectric element PE and the nozzle Nz. The piezoelectric element PE is disposed at a position that comes into contact with an ink conduit 68 for leading ink to the nozzle Nz. As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 68 as shown in the lower drawing of FIG. 5. The volume of the ink conduit 68 is reduced with an extension of the piezoelectric element PE, and a certain amount of ink corresponding to the reduced volume is sprayed as an ink particle Ip from the end of the nozzle Nz at a high speed. The ink particles Ip soak into the sheet of paper P set on the platen 26, so as to carry out printing.

The mechanism for feeding the sheet of paper P has a gear train (not shown) that transmits rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 that detects the position of the origin of the carriage 31.

In the printer 22 of the embodiment having the hardware structure discussed above, while the sheet feed motor 23 rotates the platen 26 and the other related rollers to feed the sheet of paper P, the carriage motor 24 drives and reciprocates the carriage, simultaneously with actuation of the piezoelectric elements PE on the respective ink discharge heads 61 through 64 of the print head 28. The printer 22 accordingly sprays the respective color inks and thereby forms a multi-color image on the sheet of paper P.

Although the control circuit 40 includes a non-illustrated CPU, the computer 90 internally executes the color correction according to the output characteristics of the printer 22. The printer 22 does not carry out any processing that relates to the tone number conversion or the color correction. The only processing internally executed by the printer 22 receives the data output from the computer 90 and drives the respective piezoelectric elements PE on the print head 28 synchronously with the sheet feeding operation and the reciprocating operation of the carriage 31. The structure and the processing of the control circuit 40 of the printer 22 is thus not described in detail here. The variety of operations internally executed by the computer 90 may, however, be carried out by the CPU included in the control circuit 40 of the printer 22.

B. Image Processing

The following describes the details of the image processing executed by the image processing apparatus. The image processing here implies a color correction operation, by which the input color image data are processed pixel by pixel with the color correction table CT. This embodiment carries out interpolation of the color correction table CT in order to attain the color correction. The outline of the interpolation executed in this embodiment is described first.

Figure 6:
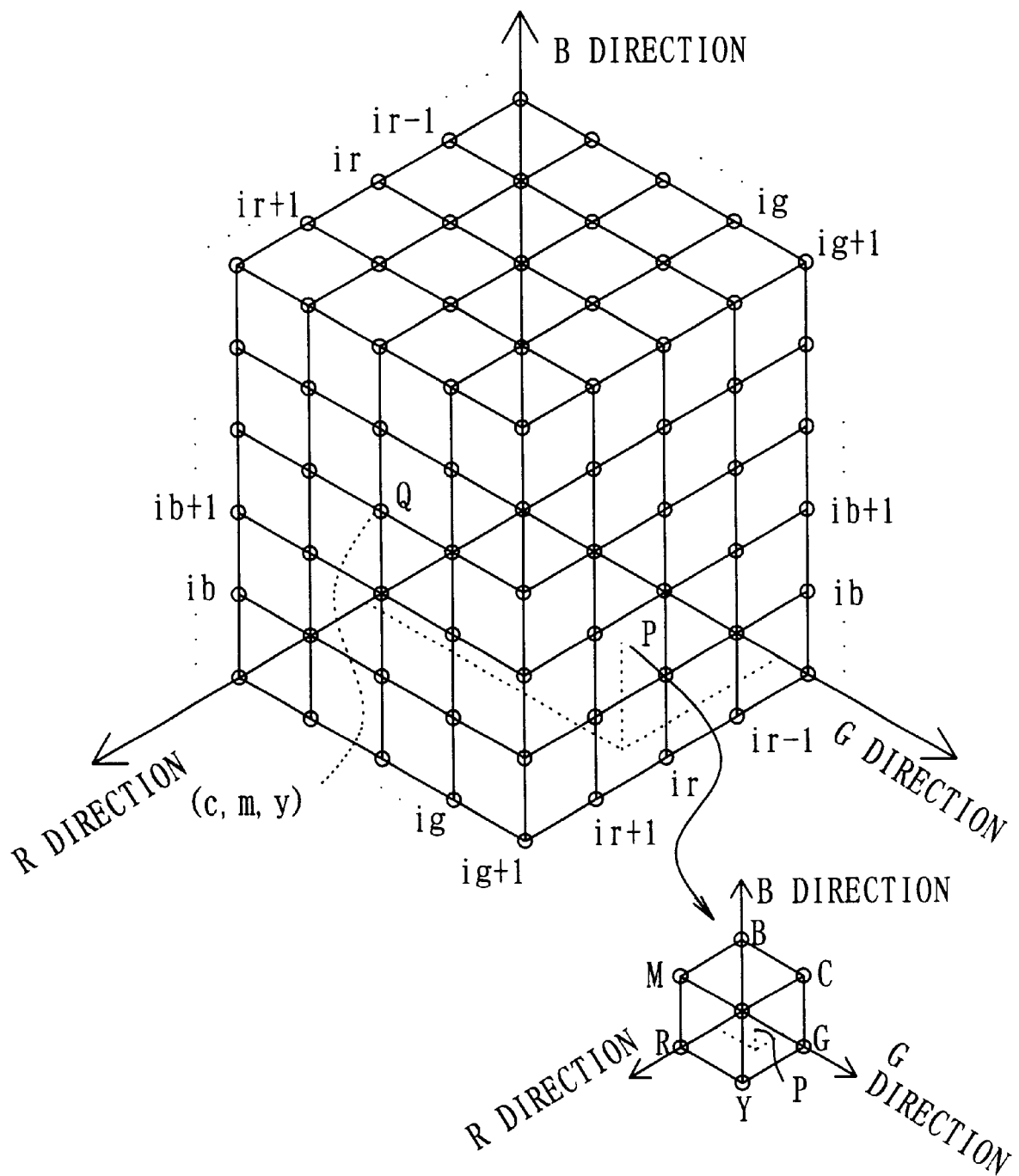
FIG. 6 shows a division of the color space in a first embodiment of the present invention.

FIG. 6 shows a division of the color space in the first embodiment. The first embodiment divides the three-dimensional color space, which has 8 bits or 256 tones for each of the colors R, G, and B, by the lattice point interval of 4 bits or 16 tones with respect to each dimension. As illustrated in FIG. 6, each lattice division defined by the adjoining lattice points forms a cube of the lattice point interval. Although only some lattice points are shown in FIG. 6 as a matter of convenience of illustration, each dimension actually has seventeen lattice points including the origin in this embodiment. The number of tones for each color and the lattice point interval may be set arbitrarily according to the desired picture quality and the other requirements.

The color correction table CT stored in the computer 90 is prepared corresponding to the respective lattice points shown in FIG. 6. The color correction table CT stores a map representing the R, G, and B tone data (which are synonymous with coordinate data) mapped to the C, M, and Y tone correction data with respect to each lattice point. This enables, for example, the output color image printed on recording paper with the color printer 22 to have equivalent colors to those of the input color original read with the scanner 12. By way of example, a lattice point Q is defined as (c,m,y) as shown in FIG. 6.

The color image data is expressed as one point in this color space and present in one of the lattice divisions shown in FIG. 6. When the color image data coincides with any lattice point, for example, the lattice point Q, shown in FIG. 6, the color correction process refers to the color correction table CT and simply reads the color correction data corresponding to the coincident lattice point. When the color image data does not coincide with any lattice point but specifies, for example, a point P shown in FIG. 6, on the other hand, the color correction process carries out interpolation of the color correction data of the nearby lattice points.

It is here assumed that the color image data is present in a specific lattice division. The first embodiment selects four lattice points out of the specific lattice division to form a tetrahedron according to the position of the color image data in the specific lattice division and carries out interpolation. This process is hereinafter referred to as the tetrahedral interpolation. The tetrahedral interpolation has high interpolation accuracy and assures the high-speed processing because of the less number of lattice point data to be referred to and the less amount of operations. Another method, for example, one using all the lattice points included in the lattice division, may be adopted for the interpolation.

FIG. 1 shows the tetrahedrons used for interpolation corresponding to various positions of the color image data. The cube shown on the center of FIG. 1 represents a lattice division including the color image data P of FIG. 6. A vertex K of the cube denotes the lattice point nearest to the origin among all the lattice points included in the lattice division. Vertexes R, G, and B respectively denote the lattice points shifted from the vertex K by one in the R, G, and B directions. Number 0 is allocated to the origin, and numbers 1, 2, 3, . . . are allocated to the lattice points of each division in the order of distance from the origin. These numbers are hereinafter referred to as lattice point numbers. Each lattice point is specified by coordinates (R,G,B) in the R, G, and B directions. The coordinates of the respective vertexes of the cube shown in FIG. 1 are expressed in the following manner:

Vertex K (ir,ig,ib)×D

Vertex R (ir+1,ig,ib)×D

Vertex G (ir,ig+1,ib)×D

Vertex B (ir,ig,ib+1)×D

Vertex Y (ir+1,ig+1,ib)×D

Vertex M (ir+1,ig,ib+1)×D

Vertex C (ir,ig+1,ib+1)×D

Vertex W (ir+1,ig+1,ib+1)×D  (6)

where D is a constant representing the lattice pointer interval and ir, ig, and ib are natural numbers of 0 to N.

The tetrahedral interpolation divides the lattice division by three planes KGWM, KBWY, and KCWR into six tetrahedrons Tetra0 through Tetra5 as shown in FIG. 1. An appropriate one of these six tetrahedrons Tetra0 through Tetra5 is selected according to the position of the color image data and used for the interpolation. The position of the color image data in the lattice division is expressed by coordinates where the origin is set at the vertex K (hereinafter referred to as the base point) of the lattice division. These coordinates are hereinafter referred to as offset coordinates. The color image data P is accordingly expressed by coordinates P (Rd,Gd,Bd) and by offset coordinates (Roff,Goff,Boff). The offset coordinates are specified in the following manner by subtracting coordinates of the base point K (ir×D,ig×D,ib×D) from the coordinates of the color image data P:

$$Roff=Rd-ir\times D$$

$$Goff=Gd-ig\times D$$

$$Boff=Bd-ib\times D \qquad (7)$$

Figure 7:
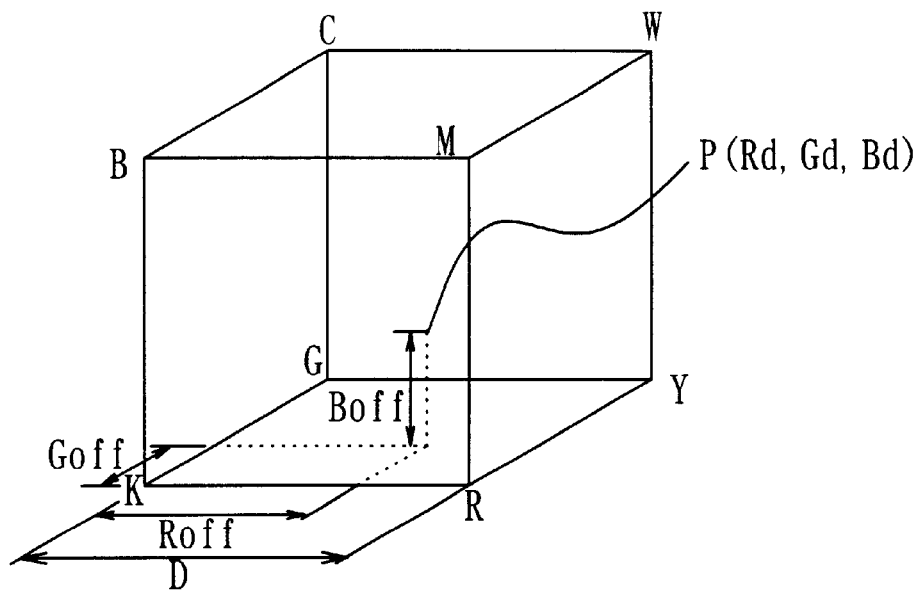
FIG. 7 shows the offset coordinates in a lattice division.

FIG. 7 shows the offset coordinates in the lattice division.

The tetrahedron used for the interpolation is defined by the four lattice points closer to the color image data, in order to reduce the error. The following concretely gives the tetrahedrons used for the interpolation according to the relation of the offset coordinates (see FIG. 1);

Roff>Goff>Boff→Tetra0;

Roff>Boff>Goff→Tetra1;

Boff>Roff>Goff→Tetra2;

Goff>Roff>Boff→Tetra3;

Goff>Boff>Roff→Tetra4; and

Boff>Goff>Roff→Tetra5.

Figure 8:
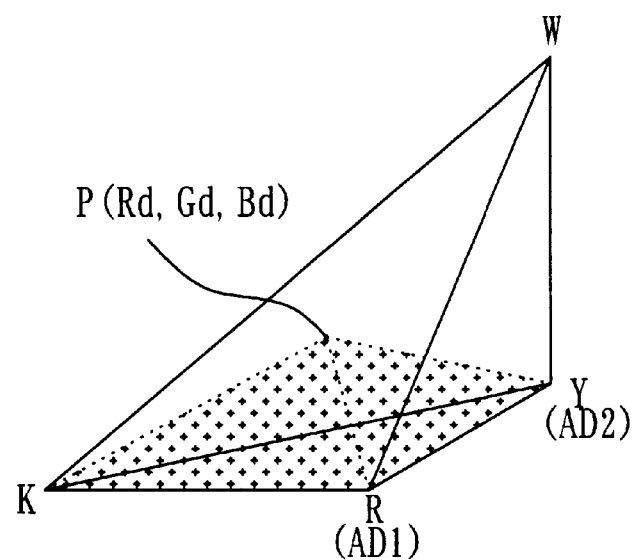
FIG. 8 shows the process of tetrahedral interpolation.

After the selection of the appropriate tetrahedron, the tetrahedral interpolation calculates weighting coefficients, by which the color correction data at the respective lattice points are multiplied, from the offset coordinates. The calculation of the weighting coefficients is described with the drawing of FIG. 8. FIG. 8 shows the tetrahedron (Tetra0 shown in FIG. 1) selected for the color image data P of FIG. 7. A weighting coefficient WW of the vertex W is given as a ratio vp/V of a volume vp of a tetrahedron KRYP (hatched portion in FIG. 8) to a volume V of a tetrahedron KRYW. In the case where the color image data P coincides with the vertex W, the weighting coefficient WW=1. In the case where the data P is present on a plane KRY, the weighting coefficient WW=0. The weighting coefficients are specified in a similar manner for the other vertexes. Namely a weighting coefficient WK of the vertex K is given as a ratio of a volume of a tetrahedron RYWP to the volume V, a weighting coefficient WR of the vertex R as a ratio of a volume of a tetrahedron KWYP to the volume V, and a weighting coefficient WY of the vertex Y as a ratio of a volume of a tetrahedron KWRP to the volume V.

The respective weighting coefficients may be expressed with the offset coordinates (Roff,Goff,Boff) and the lattice point interval D. A given example is the weighting coefficient WW of the vertex W. Since the tetrahedron KRYW and the tetrahedron KRYP have the common bottom face KRY, the volume ratio of these tetrahedrons is equal to the height ratio of the point P to the vertex W from the bottom face KRY. The height of the vertex W is the lattice point interval D and the height of the point P is Boff, so that WW=Boff/D. The other weighting coefficients are calculated in a similar manner. The following gives the weighting coefficients for the tetrahedron Tetra0:

Tetra 0:

WK=(D−Roff)/D;

WR=(Roff−Goff)/D;

WY=(Goff−Boff)/D;

WW=Boff/D  (8)

The weighting coefficients for the other tetrahedrons Tetra1 through Tetra5 are given as:

Tetra 1:

WK=(D−Roff)/D;

WR=(Roff−Boff)/D;

WM=(Boff−Goff)/D;

WW=Goff/D  (9)

Tetra 2:

WK=(D−Boff)/D;

WB=(Boff−Roff)/D;

WM=(Roff−Goff)/D;

WW=Goff/D  (10)

Tetra 3:

WK=(D−Goff)/D;

WG=(Goff−Roff)/D;

WY=(Roff−Boff)/D;

WW=Boff/D  (11)

Tetra 4:

WK=(D−Goff)/D;

WG=(Goff−Boff)/D;

WC=(Boff−Roff)/D;

WW=Roff/D  (12)

Tetra 5:

WK=(D−Boff)/D;

WB=(Boff−Goff)/D;

WC=(Goff−Roff)/D;

WW=Roff/D  (13)

The tetrahedral interpolation multiplies the color correction data of the respective lattice points by the weighting coefficients thus calculated and specifies the sum of the products as the color correction data corresponding to the color image data P. Color correction data CTP corresponding to the color image data P is given as:

CTP=WK*CTK+WW*CTW+WR*CTR+WY*CTY  (14)

where CTK, CTW, CTR, and CTY respectively denote the color correction data corresponding to the vertexes K, W, R, and Y. In this embodiment, the color correction table CT has data of the three dimensions C, M, and Y. The above arithmetic operations are accordingly carried out for the data of C, M, and Y.

This interpolation procedure calculates the weighting coefficients from the volume ratios. Another method may, however, be applicable to calculate the weighting coefficients. One available method determines the weighting coefficients based on the distances between the color image data P and the vertexes of the selected tetrahedrons.

Figure 9:
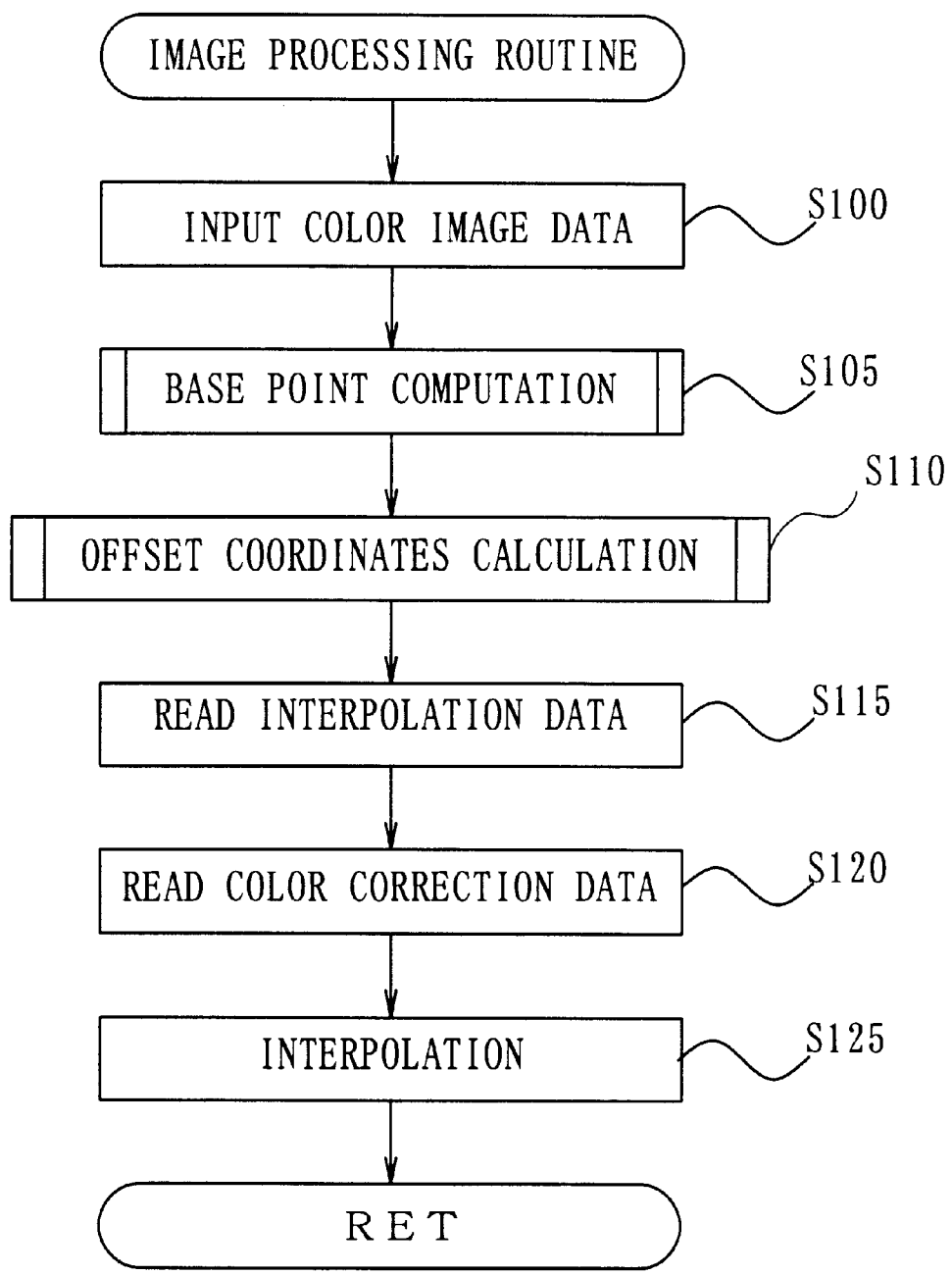
FIG. 9 is a flowchart showing the general flow of an image processing routine.

A concrete procedure of the processing in this embodiment is described with the flowchart of FIG. 9, which shows an image processing routine. The image processing routine of FIG. 9 is executed by the CPU of the computer 90.

When the program enters the image processing routine, the CPU first inputs the color image data at step S100. The color image data input here is the dot-based data, into which the original image data ORG read with the scanner 12 is converted by the rasterizer 97. The input color image data includes color information of R, G, and B with respect to each pixel. The CPU then carries out base point computation at step S105 and offset coordinates calculation at step S110. The details of these operations at steps S105 and S110 are described with the flowcharts of FIGS. 10 and 11.

Figure 10:
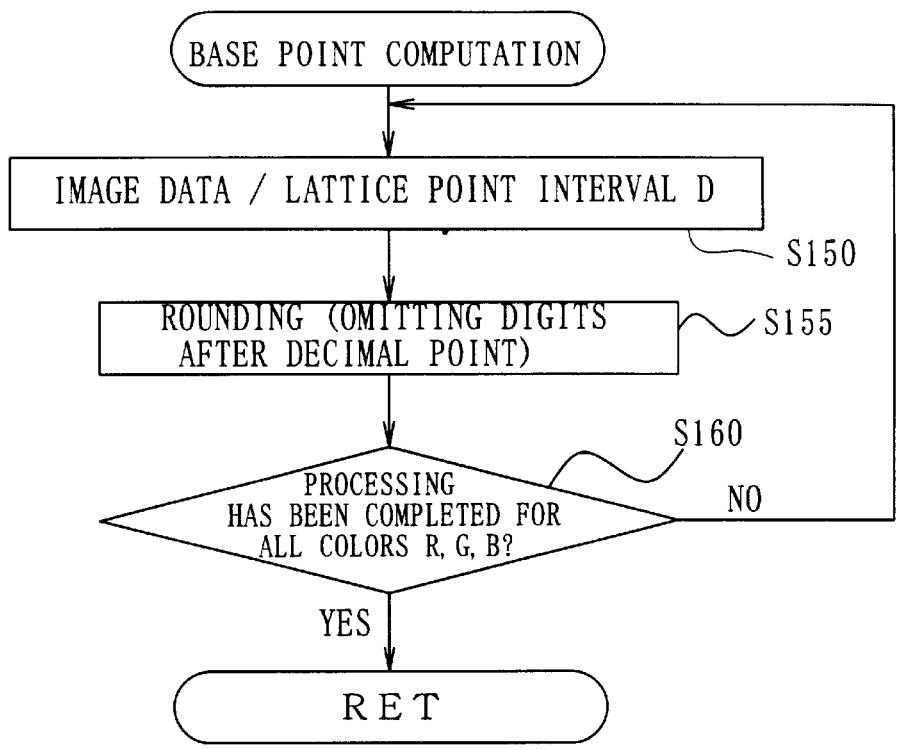
FIG. 10 is a flowchart showing a base point computation process executed in the first embodiment.

The flowchart of FIG. 10 shows the details of the base point computation. The base point computation carries out the same processing for the color data R, G, and B. For convenience of explanation, the processing for the color data R is described as an example. The process of the base point computation first divides the image data by the lattice point interval D at step S150. In the example of FIGS. 7 and 8, the process divides the image data Rd by the lattice point interval D. The process then omits the digits below the decimal point of the quotient and thereby rounds the quotient to a whole number at step S155. The integer thus obtained is output as base point data irk. The base point data irk represents the lattice point number allocated to the lattice point that is close to the origin in the R direction in the lattice division including the color image data P. The CPU subsequently determines whether or not the processing has been completed for all the colors R, G, and B at step S160. In the case where the processing has not yet been completed for all the colors, the processing of steps S150 and S155 is repeatedly executed for the remaining colors G and B. After the computation of the base point data (irk,igk,ibk) for the respective colors R, G, and B, the program exits from the process of base point computation shown in FIG. 10 and returns to the image processing routine of FIG. 9. The base point data obtained here may be the coordinates of the base point, instead of the lattice point numbers.

Figure 11:
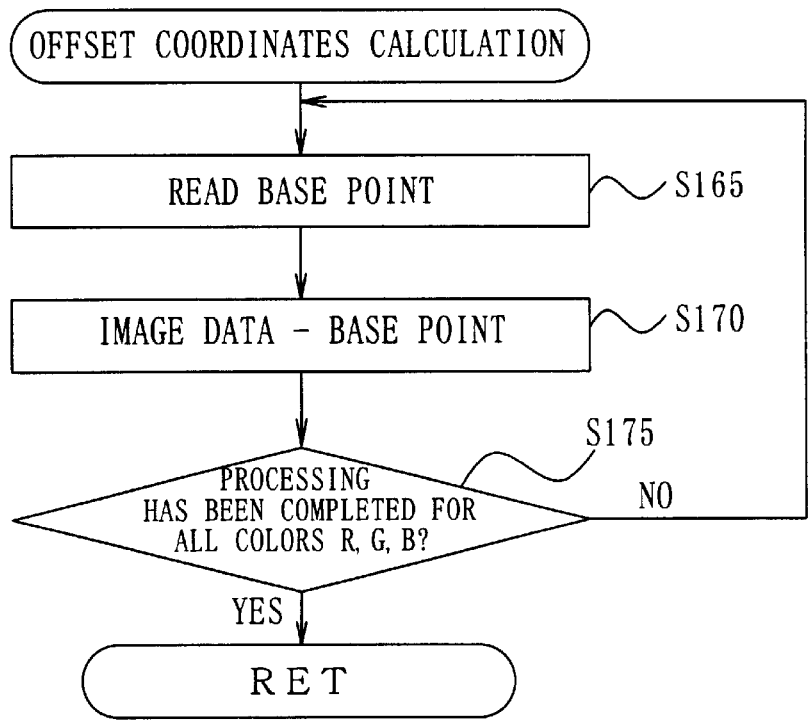
FIG. 11 is a flowchart showing an offset coordinates calculation process executed in the first embodiment.

The flowchart of FIG. 11 shows the details of the offset coordinates calculation. The offset coordinates calculation also carries out the same processing for the color data R, G, and B. The process of the offset coordinates calculation reads the base point data obtained in the process of the base point computation at step S165 and subtracts the coordinates of the base point from the coordinates of the image data at step S170. The differences obtained as the result of the subtraction represent the offset coordinates. In the example of the color data R, the coordinate of the base point is calculated as irk×D from the base point data irk and the lattice point interval D. The offset coordinate Roff corresponding to the color image data Rd is obtained by the equation of Roff=Rd−irk×D. The CPU subsequently determines whether or not the processing has been completed for all the colors R, G, and B at step S175. In the case where the processing has not yet been completed for all the colors, the processing of steps S165 and S170 is repeatedly executed for the remaining colors G and B. After the calculation of the offset coordinates (Roff,Goff,Boff) for the respective colors R, G, and B, the program exits from the process of offset coordinates calculation shown in FIG. 11 and returns to the image processing routine of FIG. 9. The offset coordinates may be calculated by another operation Roff=Rd%D, where % denotes the remainder operator.

Referring back to the image processing routine of FIG. 9, after the conclusion of the offset coordinates calculation, the CPU reads interpolation data at step S115. The concrete procedure of step S115 reads the interpolation data corresponding to the offset coordinates (Roff,Goff,Boff) from the offset correction table OT. The offset correction table OT stores lattice point specification data, which specifies the lattice points used for interpolation, and weighting coefficient data, which gives weighting coefficients, by which the respective lattice points are multiplied in the process of interpolation. The following describes the contents of the offset correction table OT.

The offset correction table OT stores the lattice point specification data and the weighting coefficient data corresponding to each of the offset coordinates (0,0,0) through (D,D,D). FIG. 12 shows an example of the offset correction table OT, which includes two pieces of lattice point specification data AD1 and AD2 and four pieces of weighting coefficient data WK, WW, W1, and W2 corresponding to the respective points defined by the offset coordinates (0,0,0) through (D,D,D). Only the two pieces of lattice point specification data AD1 and AD2 are required for the tetrahedral interpolation that uses the four lattice points about the image data. This is because all the tetrahedrons used for the tetrahedral interpolation include the vertexes K and W as shown in FIG. 1. The lattice point specification data are thus required to specify the other two points according to the offset coordinates.

The lattice point specification data is described more specifically in the example of FIG. 12. The point defined by the offset coordinates (0,0,0), that is, the vertex K shown in FIG. 1, is included in all the tetrahedrons Tetra0 through Tetra5 as shown in FIG. 1. As a matter of convenience, in this embodiment, it is assumed that the vertex K is included in the tetrahedron Tetra5. The data specifying the vertex B and the data specifying the vertex C are thus stored respectively as the lattice point specification data AD1 and AD2 in the offset correction table OT. The points defined by the offset coordinates (0,0,1) and (0,0,2) are present on a side KB shown in FIG. 1 and are included in both the tetrahedrons Tetra5 and Tetra2. As a matter of convenience, it is assumed that these points are also included in the tetrahedron Tetra5. In one example, the relation of Roff>Goff>Boff is satisfied and the tetrahedron Tetra0 shown in FIG. 1 is used for the interpolation as in the case of FIG. 8. In this case, the data specifying the vertex R and the data specifying the vertex Y are stored respectively as the lattice point specification data AD1 and AD2. What data specifies each vertex will be discussed later.

The following describes the weighting coefficient data WK, WW, W1, and W2 stored in the offset correction table OT. The weighting coefficient data WK and WW respectively denote the weighting coefficients of the vertexes K and W, whereas the weighting coefficient data W1 and W2 respectively denote the weighting coefficients of the vertexes specified by the lattice point specification data AD1 and AD2. With respect to the offset coordinates (0,0,0) that define the vertex K shown in FIG. 1, the weighting coefficient WK, by which the vertex K is multiplied in the process of the tetrahedral interpolation, is equal to one, while all the other weighting coefficients are equal to zero. The weighting coefficient data WK=1 and WW=W1=W2=0 are thus stored in the offset correction table OT as shown in FIG. 12. In a similar manner, the weighting coefficients of the vertexes K and W and the vertexes specified by the lattice point specification data AD1 and AD2 are determined for each combination of the offset coordinates. The values thus determined are stored as the weighting coefficient data WK, WW, W1, and W2 in the offset correction table OT. In the example of FIG. 12, the data that are not concretely specified but are written as WK1, WW1, and the like represent real numbers obtained in the above manner. The real number is in the range of $0 \leq$ weighting coefficient data $\leq 1$.

Figure 13:
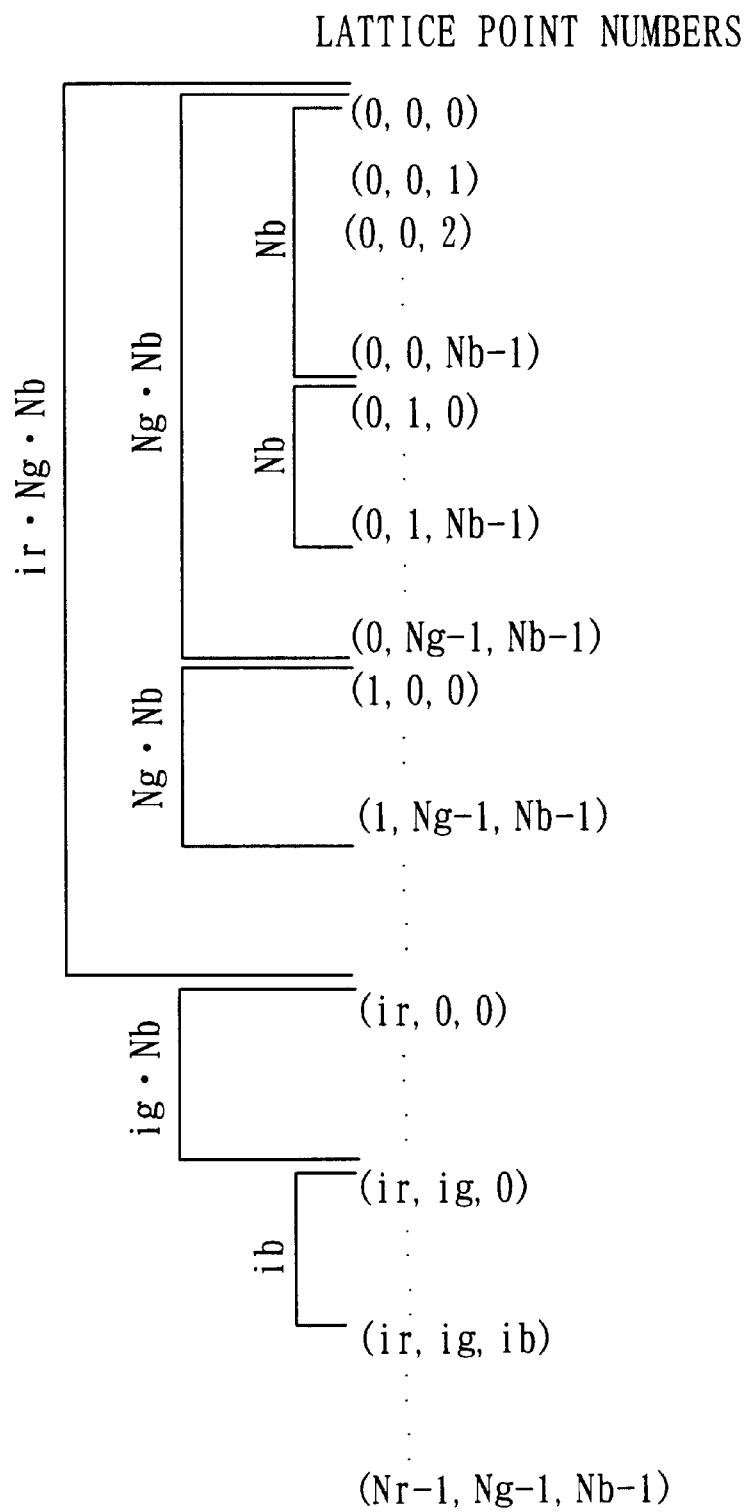
FIG. 13 shows an exemplified arrangement of a color correction table CT on the memory.

What data assigned to the lattice point specification data specifies each vertex is described in one example. For that purpose, it is required to elucidate the data arrangement of the color correction table CT on the memory. In this embodiment, the color correction table CT stored in the ROM of the computer 90 includes data corresponding to the origin (0,0,0) through the lattice point (Nr−1,Ng−1,Nb−1) arranged in this sequence for the respective colors C, M, and Y. Here Nr, Ng, and Nb denote the numbers of lattice points in the respective dimensions R, G, and B, and each lattice point is expressed by the lattice point numbers arranged in the order of R, G, and B as (ir,ig,ib). In this embodiment, Nr=Ng=Nb=17 as mentioned previously. FIG. 13 shows the data arrangement of the color correction table CT in this embodiment.

As shown in FIG. 13, the data in the color correction table CT are arranged on the memory in such a manner that increases the lattice point numbers in the order of B, G, and R. The concrete arrangement is (0,0,0), (0,0,1) . . . (0,0,Nb−1), (0,1,0), (0,1,1), . . . (0,1,Nb−1). The arrangement after (0,Ng−1,Nb−1) is (1,0,0),(1,0,1), . . . (1,0,Nb−1). The last entry in the color correction table CT is (Nr−1,Ng−1,Nb−1). The data arranged in this sequence for the color C are followed by the data for the colors M and Y arranged in a similar manner. As a matter of convenience, the numbers of color correction data for suitable divisions are given in FIG. 13. In the state where the color correction data are arranged in this one-dimensional manner, a data position or memory address AG corresponding to an arbitrary lattice point (ir, ig,ib) can be specified by Equation (15) given below by referring to these numbers of color correction data:

$$AG = ir \cdot Ng \cdot Nb + ig \cdot Nb + ib \tag{15}$$

Equation (15) determines the position or the address of the base point K (irk,igk,ibk) on the ROM. The address irk·Ng·Nb+igk·Nb+ibk of the base point K calculated by Equation (15) is hereinafter referred to as the base point address AK.

Using Equation (15) specifies the position of the color correction data assigned to each vertex in the lattice division relative to the base point K. For example, the data of the vertex R shown in FIG. 1 is present after the base point K by Ng·Nb. In other words, Ng·Nb represents the relative address of the vertex R to the base point address AK. This is because the vertex R has the positional relation of (irk+1,igk,ibk) to the base point K (irk,igk,ibk). From this point of view, it is understood that the relative address Ng·Nb should be stored as the lattice point specification data AD1 in the offset correction table OT when the vertex R is used for the interpolation. The lattice point specification data AD can be prepared in a similar manner when another vertex is used for the interpolation. This embodiment utilizes the relative positional data on the memory as the lattice point specification data AD1 and AD2. The lattice point specification data AD for the respective vertexes are accordingly given as:

Vertex R: Ng·Nb
Vertex G: Nb
Vertex B: 1
Vertex C: Nb+1
Vertex M: Ng·Nb+1
Vertex Y: Ng·Nb+Nb The lattice point specification data AD are varied with a variation in sequence of the data arrangement in the color correction table CT. The lattice point specification data may be codes representing the respective vertexes or have another data form. The above structure of storing the relative addresses on the memory facilitates the process of reading the color correction data discussed below, thereby advantageously enhancing the processing speed.

Figure 14:
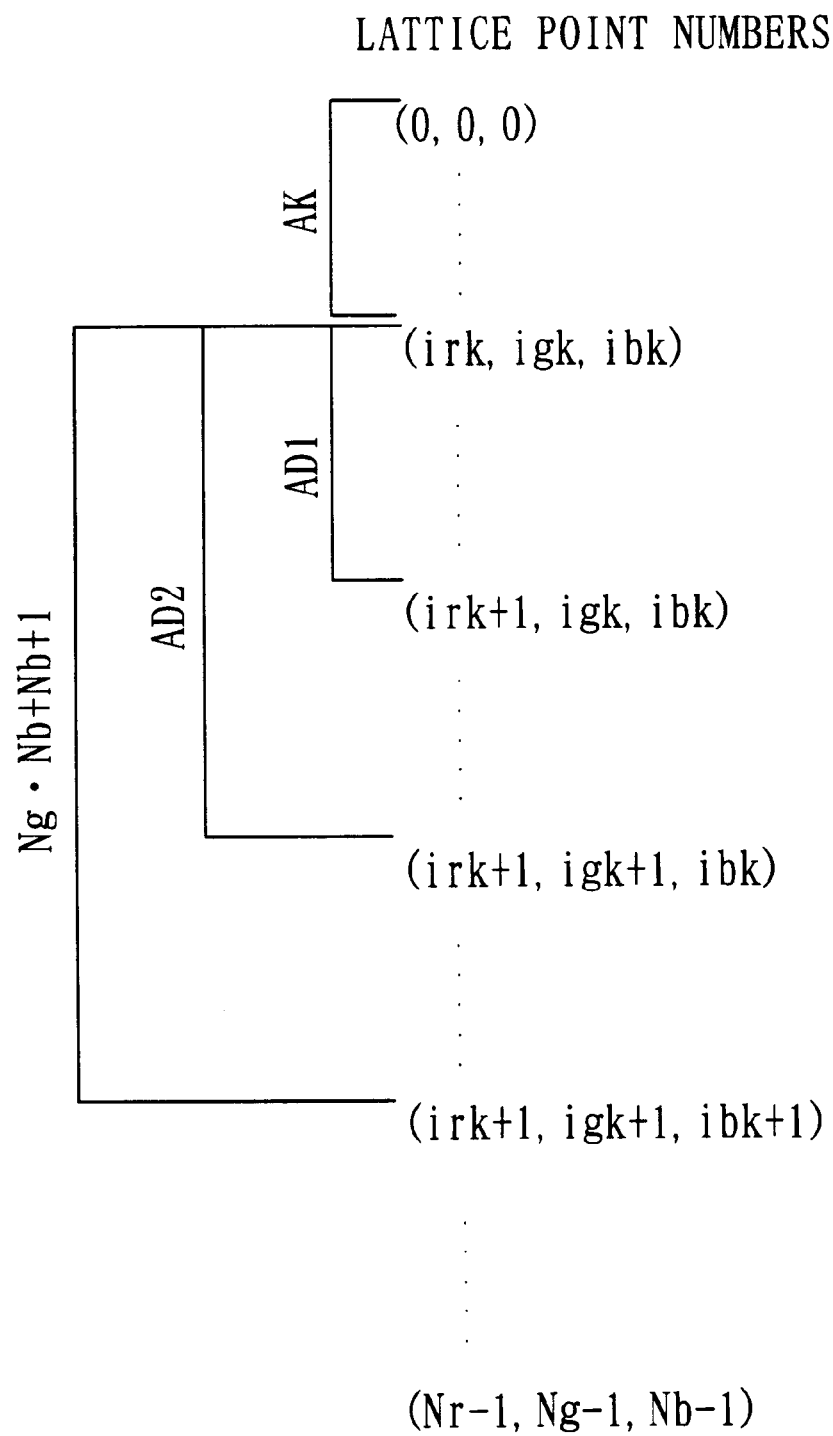
FIG. 14 shows the relationship between the data in the offset correction table OT and the data in the color correction table CT on the memory.

Referring back again to the image processing routine of FIG. 9, the CPU reads the color correction data at step S120 after reading the interpolation data from the offset correction table OT as described above at step S115. The process of reading the color correction data is described with the drawing of FIG. 14. FIG. 14 shows the relationship between the data in the color correction table CT and the interpolation data read from the offset correction table OT. Like FIG. 13, the lattice point numbers (0,0,0) through (Nr−1,Ng−1,Nb−1) in FIG. 14 represent the data arrangement of the color correction table CT on the memory. The lattice point (irk, igk,ibk) in FIG. 14 represents the base point or the vertex K. The data corresponding to the base point K is stored on the memory after the data corresponding to the lattice point (0,0,0) by the base point address AK. The color correction data corresponding to the base point can thus be read based on the base point address AK.

The color correction data corresponding to the vertexes specified by the lattice point specification data AD are read in the following manner. As mentioned previously, the lattice point specification data AD used for interpolation are read at step S115. The addresses relative to the base point K are allocated to the lattice point specification data AD1 and AD2. The color correction data corresponding to the vertexes specified by the lattice point specification data AD are accordingly read from the memory positions determined by adding the lattice point specification data AD1 and AD2 to the base point address AK. In the example of FIG. 14, the relative address Ng·Nb for specifying the vertex R (irk+1, igk,ibk) is stored as the lattice point specification data AD1, whereas the relative address Ng·Nb+Nb for specifying the vertex Y (irk+1,igk+1,ibk) is stored as the lattice point specification data AD2. The vertex W has the positional relation of (irk+1,igk+1,ibk+1) to the base point K (irk,igk, ibk). The color correction data corresponding to the vertex W are thus read from the memory position determined by adding Ng·Nb+Nb+1 to the base point address AK.

The CPU subsequently executes interpolation using the color correction data obtained in the above manner and the weighting coefficient data at step S125. The interpolation executed here is identical with the arithmetic operation of Equation (14) discussed in (2) Image Processing. Color correction data CP corresponding to the color image data P is given as:

$$CP = WK*CTK + WW*CTW + W1*CT1 + W2*CT2 \tag{16}$$

where CTK, CTW, CT1, and CT2 respectively denote the color correction data corresponding to the vertexes K and W and the vertexes specified by the lattice point specification data AD1 and AD2, and WK, WW, W1, and W2 denote the weighting coefficient data for the respective vertexes. In this embodiment, the color correction table CT has the data of the three dimensions C, M, and Y, so that the above arithmetic operation is carries out for the data of the respective colors C, M, and Y. The CPU accordingly obtains the color correction data of each pixel and exits from the image processing routine.

The image processing apparatus of this embodiment interpolates the color correction table and executes the image processing, thereby realizing color correction with an extremely small error with respect to each pixel. Using the offset correction table OT enables the interpolation to be carried out without conditional jumps, thereby attaining the high-speed image processing. As discussed previously, the conventional tetrahedral interpolation requires selection of the appropriate lattice points according to the offset coordinates. This leads to a lot of conditional jumps and requires a variety of operations, such as computation of the weighting coefficients, at each branch. This embodiment, however, utilizes the offset correction table OT, which realizes the tetrahedral interpolation without any conditional jumps. The image processing that can be executed without any conditional jumps is especially suitable for the pipelined processors, such as Pentium II (registered trade mark by Intel Corp). The image processing of this embodiment with such a processor is four through five times faster than the conventional image processing including a lot of conditional jumps.

In this embodiment, the three-dimensional color space of 8 bits or 256 tones is divided by the lattice point interval of 4 bits or 16 tones with respect to each of the dimensions R, G, and B. Namely the lattice point interval is N/2 bits, when the number of tones is expressed by N bits (N=8 in this embodiment). In this embodiment, the color correction table CT has three pieces of data (c,m,y) with respect to each lattice point, whereas the offset correction table OT has six pieces of data AD1, AD2, WK, WW, W1, and W2 with respect to each combination of coordinates. In the three-dimensional color space, the amount of data in the color correction table CT is compared with the amount of data in the offset correction table OT. It may be thought that the number of data for the respective lattice points is substantially equal to the number of data for the respective combinations of coordinates. Dividing the color space by the lattice point interval of 4 bits corresponding to N/2 bits minimizes the sum of the amount of data in the color correction table CT and the offset correction table OT. This effectively reduces the required storage capacity. The lattice point interval is not restricted to 4 bits but should be the number of bits corresponding to approximately half the number of tones. In other words, it is required that the amount of data in the color correction table CT is substantially equal to the amount of data in the offset correction table OT. When this relationship is not satisfied, for example, when a smaller lattice point interval is adopted, the amount of data in the offset correction table OT is reduced, while the amount of data in the color correction table CT is significantly increased. This results in increasing the required storage capacity as the total. When a greater lattice point interval is adopted, on the other hand, the amount of data in the offset correction table OT is significantly increased. A desired value can be set to the lattice point interval according to the margin of the storage capacity.

In this embodiment, the offset correction table stores the lattice point specification data and the weighting coefficient data. Another type of data used for calculating the weighting coefficients may be stored instead of the weighting coefficient data. As described previously, the weighting coefficients used in the process of interpolation with one of the tetrahedrons Tetra0 through Tetra5 shown in FIG. 1 are expressed as Equations (8) through (13) given above. These equations can be rewritten as:

WK=(D−OFF1)/D;

W1=(OFF1−OFF2)/D;

W2=(OFF2−OFF3)/D;

WW=OFF3/D         (17)

where OFF1, OFF2, and OFF3 are variables, each taking one of the values Roff, Goff, and Boff according to the selected tetrahedron among those shown in FIG. 1.

By way of example, when Tetra0 is the selected tetrahedron for interpolation as clearly understood from Equations (8), W1=WR, W2=WY, OFF1=Roff, OFF2=Goff, and OFF3=Boff. In Equations (17), the lattice point interval D is independent of the offset coordinates but is constant. The weighting coefficients can thus be calculated as long as the three pieces of data OFF1, OFF2, and OFF3 are specified. For the calculation of the weighting coefficients, the offset correction table OT may accordingly store these three pieces of data OFF1, OFF2, and OFF3 in place of the four pieces of weighting coefficient data WK, WW, W1, and W2. This structure that stores the three pieces of data requires calculation of the weighting coefficients from the data stored in the offset correction table OT but favorably reduces the required size of the offset correction table OT, compared with the structure that stores the four pieces of weighting coefficient data.

The following describes the processing executed when the color image data is in the vicinity of the maximum coordinate. As described previously, the number of tones and the lattice point interval in the color space can be set arbitrarily. In some setting for the number of tone and the lattice point interval, the maximum coordinate of each dimension may not correspond to a lattice point. For example, if the lattice point interval is 17 when each dimension has 256 tones, that is, when the coordinate of each dimension is in the range of 0 to 255, the lattice points have the coordinates of 0, 17, 34, . . . 255. In this case, the maximum coordinate 255 corresponds to a lattice point. If the lattice point interval is 16, on the other hand, the lattice points have the coordinates of 0, 16, 32, . . . , 240, (256). In this case, the maximum coordinate 255 does not correspond to a lattice point. As described below, the structure of this embodiment can be applied to the case where the number of tones and the lattice point interval are set in this manner.

When the point of the maximum coordinate coincides with a lattice point, any special processing is not required. With respect to the color image data having the maximum coordinate in any dimension, a lattice division including greater coordinates than the maximum coordinate, that is, a lattice division with no existing data, is used for interpolation in the image processing routine of FIG. 9. In this case, at step S120 in the flowchart of FIG. 9, the CPU may read the data stored in a memory area that is independent of the area in which the color correction table is actually stored. The interpolation of the color correction table, however, always makes the weighting coefficient, by which the input data is multiplied, equal to zero. This means that such data do not affect the result of the color correction, and thereby no special processing is required. In order to ascertain the image processing, the color correction table may be provided for a virtual lattice point that has a greater coordinate than the maximum coordinate.

In the second case, the point of the maximum coordinate does not coincide with a lattice point. By way of example, each dimension has 256 tones (0 through 255) and the lattice point interval is 16 tones. The first embodiment described above corresponds to this case. With respect to the color image data having the coordinates of not smaller than 240, the virtual lattice point having the coordinate value of 256 is used for interpolation. Unlike the first case, the interpolation of the color correction table does not make the weighting coefficient for the virtual lattice point equal to zero. In this case, virtual color correction data that gives the appropriate color correction data at the maximum coordinate is stored corresponding to the virtual lattice point having the coordinate value of 256. This arrangement gives the appropriate color correction data in the area having the coordinates of not smaller than 240.

C. Image Processing Apparatus in Second Embodiment

Figure 15:
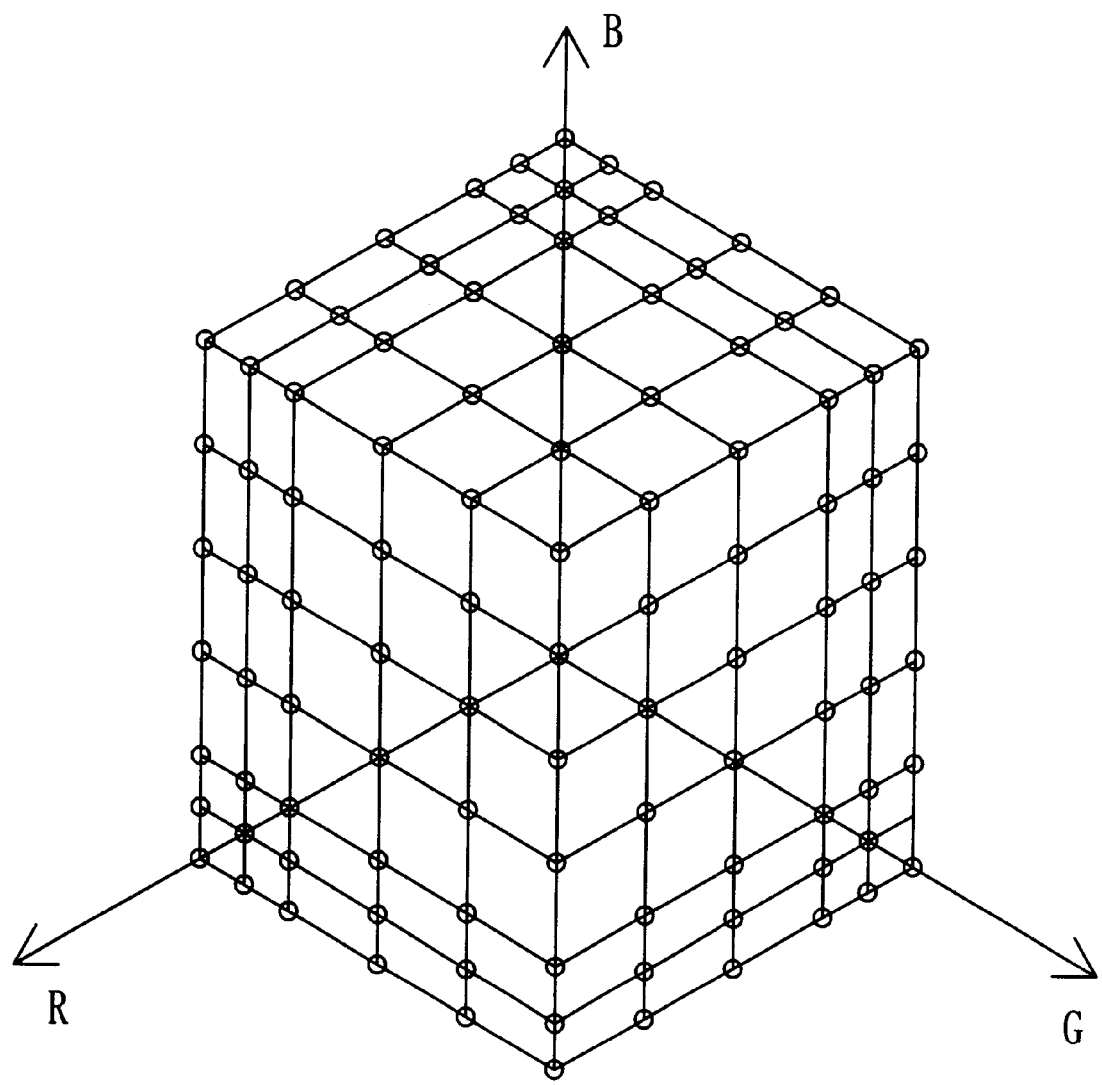
FIG. 15 shows a division of the color space in a second embodiment of the present invention.

The following describes another image processing apparatus as a second embodiment according to the present invention. The image processing apparatus of the second embodiment has an identical hardware structure with that of the image processing apparatus of the first embodiment described previously. The difference from the first embodiment is that the second embodiment divides the color space by a varying lattice point interval and uses the color correction data provided corresponding to the lattice points. FIG. 15 shows a division of the color space in the second embodiment. Although the three dimensions R, G, and B have the same varying lattice point interval in the example of FIG. 15, the principle of the second embodiment is applicable to the case where the respective dimensions have different varying lattice point intervals. Adopting the varying lattice point interval makes part of the processing in the second embodiment different from that in the first embodiment, although the basic flow of the image processing routine executed by the CPU of the computer 90 in the second embodiment is similar to that of the first embodiment shown in the flowchart of FIG. 9.

When the program enters the image processing routine, like the first embodiment, the CPU first reads the color image data (at step S100 in the flowchart of FIG. 9) and carries out the base point computation (at step S105). The process of base point computation in the second embodiment is different from that in the first embodiment, as described below with the flowchart of FIG. 16.

The base point computation carries out the same processing for the color data R, G, and B. For convenience of explanation, the processing for the color data R is described as an example. When the process of the base point computation starts, the CPU initializes a variable 'n' to zero and determines whether the color image data Rd of the R color component satisfies the condition of R(0)≦Rd<R(1) at step S200. Here R(n) represents the coordinate of an n-th lattice point in the R direction. It is accordingly determined at step S200 whether or not the color image data is present in a lattice division that is defined by the origin and an adjoining lattice point in the R direction.

In the case of the negative answer, the CPU increments the variable 'n' by one and carries out the similar determination. Namely the program successively increments the variable 'n' by one and repeatedly carries out the determination for the condition of, for example, R(1)≦Rd<R(2), R(2)≦Rd<R(3), . . . , until any one of the conditions is fulfilled. When the condition is fulfilled, it means that the color image data Rd is included in a lattice division that is defined by the lattice points R(n) and R(n+1). The CPU accordingly substitutes the value of the variable 'n' that satisfies the condition into the base point irk in the R direction at step S205. The CPU subsequently determines whether or not the processing has been completed for all the colors R, G, and B at step S210. In the case where the processing has not yet been completed for all the colors, the processing of steps S200 and S205 is repeatedly executed for the remaining colors G and B. This process determines the base point (irk,igk,ibk) of the lattice division that includes the color image data. The base point obtained here may be the coordinate R(n) of the lattice point, instead of the lattice point number.

Figures 17, 18:
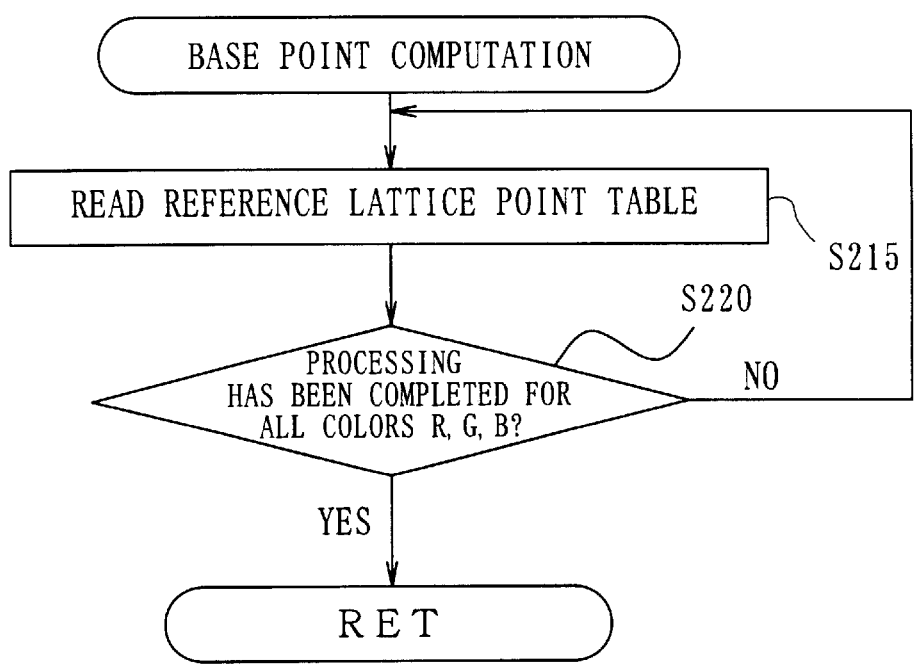
FIG. 17 is a flowchart showing another base point computation process executed in the second embodiment.
FIG. 18 shows a reference lattice point table as an example.

The base point computation may follow the process shown in the flowchart of FIG. 17. This method provides a table storing lattice point number data of the base points corresponding to the coordinates in the R direction, as a reference lattice point table. FIG. 18 shows a reference lattice point table as an example. Three one-dimensional reference lattice point tables are prepared for the coordinates in the R, G, and B directions. The example of FIG. 18 shows the reference lattice point table corresponding to the coordinates in the R direction. When the lattice points after the origin have the coordinate values 10, 20, . . . , in the R direction, the value '0' or the lattice point number of the origin, which means that the origin is the base point, is allocated to the coordinate values 0 to 9 in the reference lattice point table as shown in FIG. 18. The value '1' or the lattice point number of the lattice point having the coordinate value 10, which means that the lattice point having the coordinate value 10 is the base point, is allocated to the coordinate values 10 to 19. The reference lattice point data are allocated in this manner corresponding to the coordinate of the lattice point. Referring to the flowchart of FIG. 17, the base point computation process reads the reference lattice point data corresponding to the coordinate Rd of the color image data from the reference lattice point table at step S215. The CPU then determines whether or not the processing has been completed for all the colors R, G, and B at step S220. In the case where the processing has not yet been completed for all the colors, the processing of step S215 is repeatedly executed for the remaining colors G and B.

Figure 16:
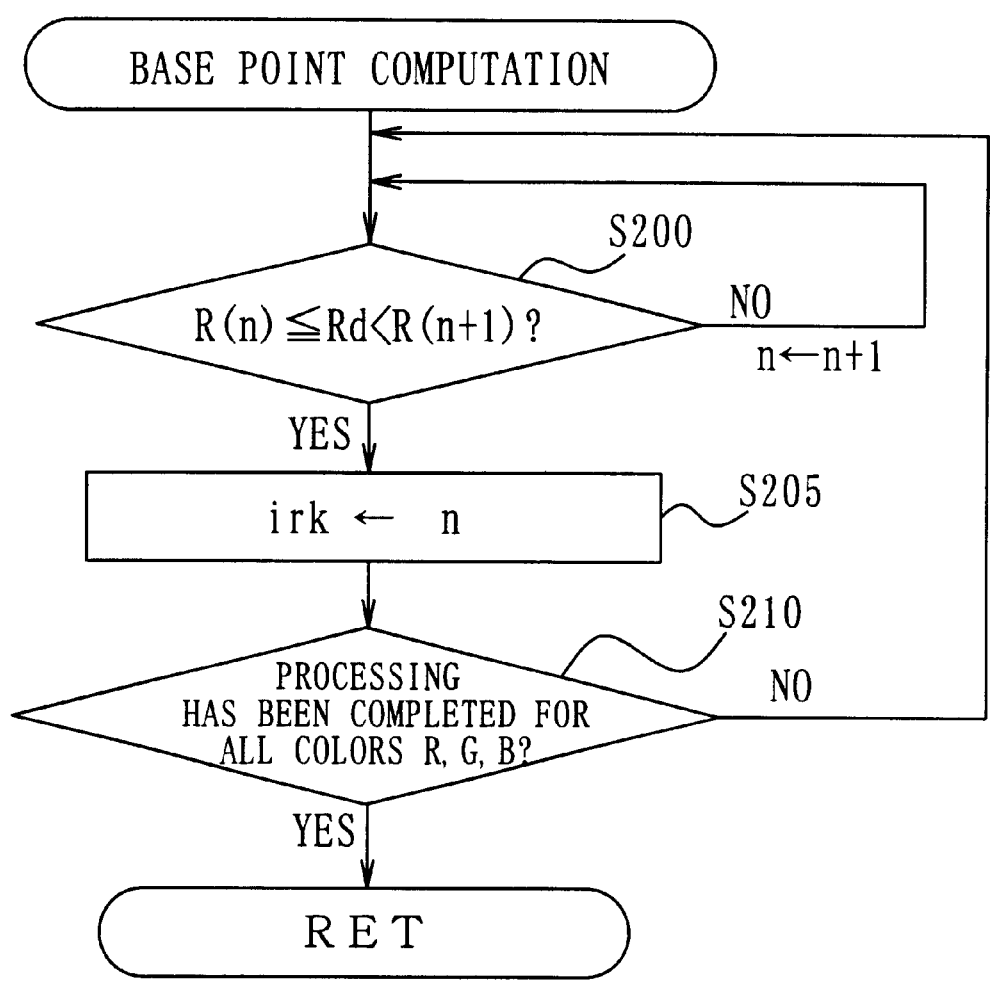
FIG. 16 is a flowchart showing one base point computation process executed in the second embodiment.

This structure does not require the conditional jumps included in the routine of FIG. 16 and thereby realizes the high-speed base point computation. Although this structure requires the memory for storing the reference lattice point tables, these one-dimensional tables occupy the relatively small storage capacity. When the coordinates of the lattice points in the R, G, and B directions are coincident with one another, one reference lattice point table can be used in common. This further reduces the required storage capacity. The reference lattice point tables may store the coordinates of the base points, in place of the base point numbers.

After the computation of the base point, the CPU carries out the offset coordinates calculation (step S110 in the flowchart of FIG. 9). The process of the offset coordinates calculation in the second embodiment is different from that in the first embodiment. The following describes the offset coordinates calculation with the flowchart of FIG. 19.

The offset coordinates calculation carries out the same processing for the color data R, G, and B. For convenience of explanation, the processing for the color data R is described as an example. When the process of the offset coordinates calculation starts, the CPU first calculates a variable DUM1 by subtracting a coordinate R(irk) of the lattice point corresponding to a base point Rb from the color image data Rd at step S230. The variable DUM1 represents an offset from the lattice point in the coordinate system shown in FIG. 15. The CPU then calculates a variable DUM2 according to an equation of DUM2=DUM1/Rdist× Dr at step S235. Here Rdist denotes a lattice point interval of the lattice division in the R direction, in which the color image data Rd is included, and Dr denotes a predetermined virtual lattice point interval. The variable DUM2 accordingly represents the offset coordinate in the coordinate system where the lattice point interval of the lattice division is converted into the virtual lattice point interval Dr. The CPU subsequently rounds the variable DUM2 to a whole number and specifies the integer as the offset coordinate at step S240. For the smaller round-off error, it is desirable to round the variable DUM2 to the nearest whole number. Another available method omits the digits below the decimal point or raises the digits below the decimal point to a unit. This process of determining the offset coordinate in the coordinate system where the lattice point interval is converted into the virtual lattice point interval Dr is called the normalizing process. The CPU subsequently determines whether or not the processing has been completed for all the colors R, G, and B at step S245. In the case where the processing has not yet been completed for all the colors, the normalizing process, that is, the processing of steps S230 through S240, is repeatedly executed for the remaining colors G and B to calculate the offset coordinates.

In this embodiment, the virtual lattice point interval Dr coincides with the lattice point interval in a low density area, and the virtual lattice point intervals in the R, G, and B directions are identical with one another. The low density area has large coordinate values in the R, G, and B directions in the coordinate system of FIG. 15. As described previously, in the low density area, only a slight error in color correction may lead to significant deterioration of the picture quality. The arrangement of making the virtual lattice point interval Dr coincident with the lattice point interval in the low density area, however, effectively prevents the round-off error due to the normalizing process in this area and assures the favorable picture quality.

Even when the virtual lattice point interval Dr does not coincide with the lattice point interval in the low density area, any integral ratio of the virtual lattice point interval to the lattice point interval effectively prevents the round-off error due to the normalizing process and assures the favorable picture quality. This means that the virtual lattice point interval Dr is set to be wider than the lattice point interval, in order to satisfy the condition that the virtual lattice point interval Dr is an integral multiple of the lattice point interval. The arrangement of setting the least common multiple of a plurality of different lattice point intervals to the virtual lattice point interval Dr enables substantially no round-off error to occur in any lattice division. The virtual lattice point interval Dr can be set arbitrarily and is not necessarily coincident with any lattice point interval. Different virtual lattice point intervals Dr, Dg, and Db may be specified in the R, G, and B directions.

In this embodiment, each of the R, G, and B directions has 256 tones of 0 to 255 and the lattice point interval is 16 tones. The structure of the first embodiment divides the color space from the origin by the lattice point interval 16 and specifies the coordinates of the lattice points as 0, 16, 32, . . . , 240, (256). The maximum coordinate 255 accordingly does not correspond to a lattice point. The structure of the second embodiment, on the other hand, divides the color space from the maximum coordinate 255 by the lattice point interval 16 and sets the lattice point interval in the vicinity of the origin equal to 15. The coordinates of the given lattice points are accordingly 0, 15, 31, . . . , 239, 255. If the virtual lattice point interval Dr is set equal to the lattice point interval 16, substantially no round-off error occurs in any area except the highest density area (that is, the lattice divisions in the vicinity of the origin). The effect of the round-off error on the picture quality is generally negligible in the high density area and thereby the favorable picture quality is attained. Setting the virtual lattice point interval Dr equal to 240, which is the least common multiple of 15 and 16, prevents the round-off error in any areas.

Although the virtual lattice point interval Dr can be set arbitrarily, it is preferable to set the virtual lattice point interval Dr to be not narrower than any lattice point interval. The following problem may arise if there is an area having a wider lattice point interval than the virtual lattice point interval Dr. For example, it is assumed that the virtual lattice point interval Dr is equal to 2 and that a section of the lattice point interval 6 is subjected to the normalizing process. The points of the offset coordinates 0 through 5 in the original coordinate system are respectively converted to the coordinate values of 0, 0, 1, 1, 1, 2 in the coordinate system after the normalizing process, which rounds the coordinate value/ 6×2 to the nearest whole number. The six coordinate values 0 through 5 are mapped to one of the three values 0, 1, and 2 by the rounding operation of the normalizing process. As a result, the color correction data corresponding to the three points of the coordinate values 2 through 4 in the original coordinate system have an identical value, which causes an error in image processing. This problem arises in the area where the virtual lattice point interval Dr is narrower than the lattice point interval in the original coordinate system. If the virtual lattice point interval Dr is set equal to 6 and coincides with the lattice point interval, no such error arises as clearly understood. It is accordingly preferable to set the virtual lattice point interval Dr to be not narrower than any lattice point interval.

Figures 20, 21:
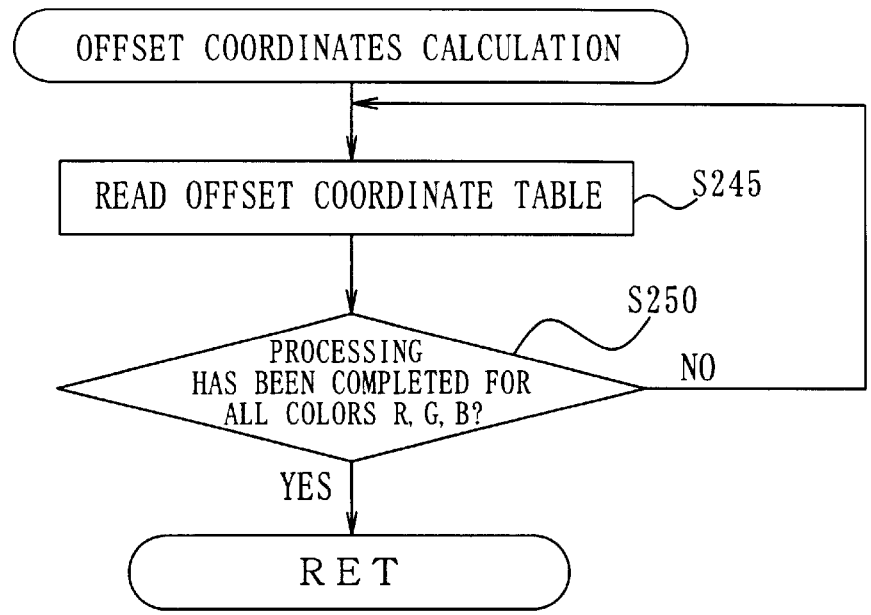
FIG. 20 is a flowchart showing another offset coordinates calculation process executed in the second embodiment.
FIG. 21 shows an offset coordinate table as an example.

The offset coordinates calculation may follow the process shown in the flowchart of FIG. 20. This method provides a table storing offset coordinates corresponding to the coordinates in the R direction, as an offset coordinate table. FIG. 21 shows an offset coordinate table as an example. Three one-dimensional offset coordinate tables are prepared for the coordinates in the R, G, and B directions. The example of FIG. 21 shows the offset coordinate table corresponding to the coordinates in the R direction. For example, when the lattice points after the origin have the coordinate values 10, 20, . . . , in the R direction and the virtual lattice point interval Dr is equal to 10, the coordinates of the color image data Rd are stored as the offset coordinates in the offset coordinate table as shown in FIG. 21, since the origin is the base point in the range of the coordinates of 0 through 9. The lattice point 1 defined by the coordinate value 10 is the base point in the range of the coordinates of 10 through 19, so that the values obtained by subtracting the coordinate value 10 of the base point from the respective color image data Rd are stored as the offset coordinates. The offset coordinate data are stored corresponding to the coordinates of the lattice points in this manner. For the purpose of simplicity, this example shows the case where the virtual lattice point interval coincides with the lattice point interval. When the virtual lattice point interval does not coincide with the lattice point interval, the values after the normalizing process are stored as the offset coordinates. Referring to the flowchart of FIG. 20, the offset coordinates computation process reads the offset coordinate data corresponding to the coordinate Rd of the color image data from the offset coordinate table at step S245. The CPU then determines whether or not the processing has been completed for all the colors R, G, and B at step S250. In the case where the processing has not yet been completed for all the colors, the processing of step S245 is repeatedly executed for the remaining colors G and B.

Figure 19:
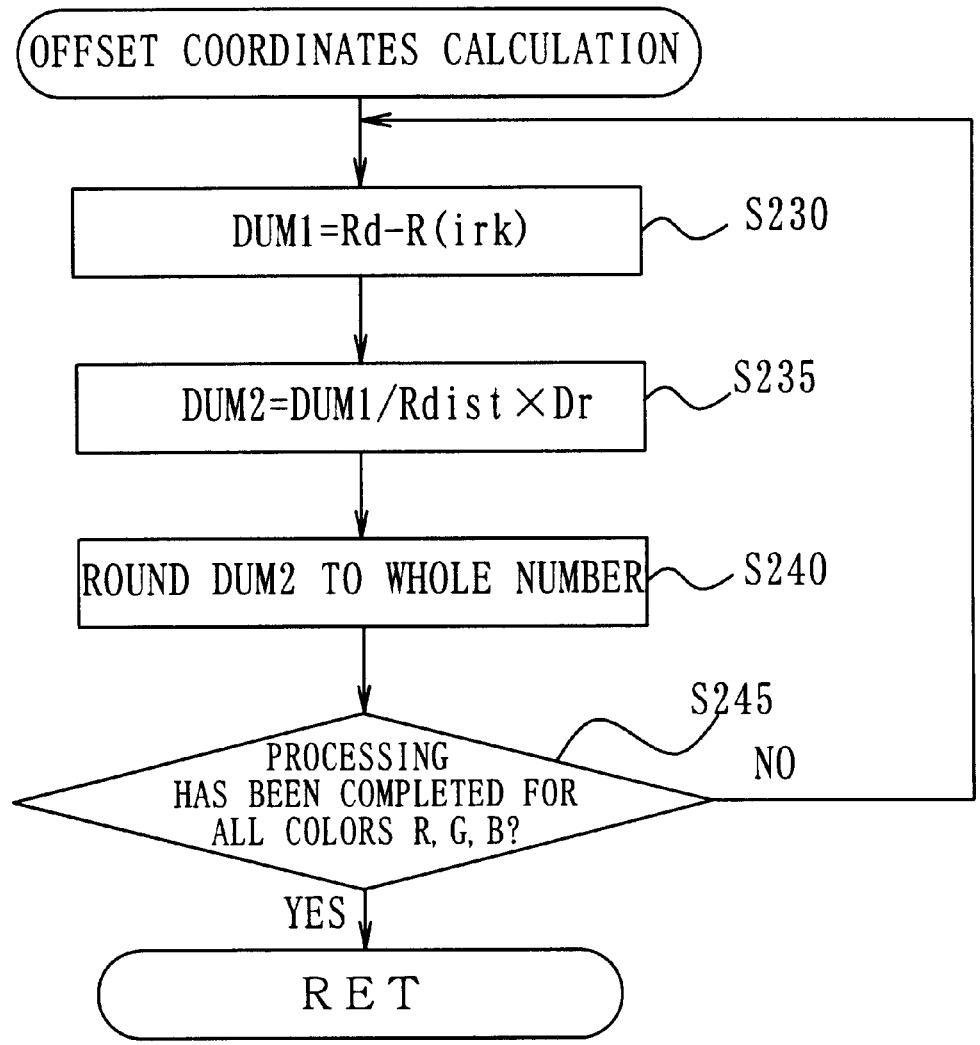
FIG. 19 is a flowchart showing one offset coordinates calculation process executed in the second embodiment.

This structure does not require any arithmetic operations included in the routine of FIG. 19 and thereby realizes the high-speed offset coordinates calculation. Although this structure requires the memory for storing the offset coordinate tables, these one-dimensional tables occupy the relatively small storage capacity. When the coordinates of the lattice points in the R, G, and B directions are coincident with one another, one offset coordinate table can be used in common. This further reduces the required storage capacity.

Either one of the base point computation processes shown in the flowcharts of FIGS. 16 and 17 may be freely combined with either one of the offset coordinates calculation processes shown in the flowcharts of FIGS. 19 and 20. For example, when the storage capacity hardly has a margin, the program carries out the base point computation of FIG. 16 and the offset coordinates calculation of FIG. 19. When the storage capacity has a little margin, on the other hand, the program utilizes either one of the reference lattice point tables and the offset coordinate tables (that is, the combination of the routines of FIGS. 17 and 19 or the combination of the routines of FIGS. 16 and 20). When the storage capacity has a sufficient margin, the program utilizes both the reference lattice point tables and the offset coordinate tables (that is, the combination of the routines of FIGS. 17 and 20).

As discussed above, the image processing apparatus of the second embodiment interpolates the color correction table CT with the offset correction table OT and carries out the image processing. Like the first embodiment, this structure thus enables the high-speed color correction with an extremely small error with respect to each pixel. The structure of the second embodiment divides the color space by the varying lattice point interval. For example, the low density area may have the finer divisions than those in the other areas. This effectively improves the resulting picture quality. It is not necessary to set the identical lattice point interval to all the dimensions, but the lattice point interval may be set arbitrarily for each color component or dimension according to the visual sensitivity. This arrangement favorably reduces the capacity of the color correction table while maintaining the picture quality.

The computer 90 executes the variety of processes shown in the flowchart of FIG. 9 according to the programs, in order to realize the image processing in the image processing apparatus. The principle of the present invention may thus be applied to a recording medium, on which programs for realizing the respective functions discussed above are stored. The programs for realizing the respective functions discussed above are stored in a computer readable recording medium, such as floppy disks and CD-ROMs. The computer 90 reads required programs from the recording medium and transfers the programs to an internal storage device or an external storage device. The programs may alternatively be supplied to the computer 90 via a communication path. The microprocessor in the computer 90 executes the programs stored in the internal storage device, in order to realize the functions of the programs. In accordance with another application, the computer 90 may directly read and execute the programs stored in the recording medium.

Independently of the programs for executing the variety of processes shown in the flowchart of FIG. 9, the lattice point information table, the color correction table, and the offset correction table may be recorded on a recording medium. In this case, the computer 90 carries out the respective processes shown in the flowchart of FIG. 9 while referring to the corresponding tables recorded on the recording medium. The reference lattice point tables and the offset coordinate tables may also be recorded on this recording medium.

In the first and the second embodiments, the CPU executes the image processing routine of FIG. 9 in the software configuration. This may, however, be realized by the hardware structure. The image processing apparatus of such hardware structure may be incorporated in the printer 22.

Figure 22:
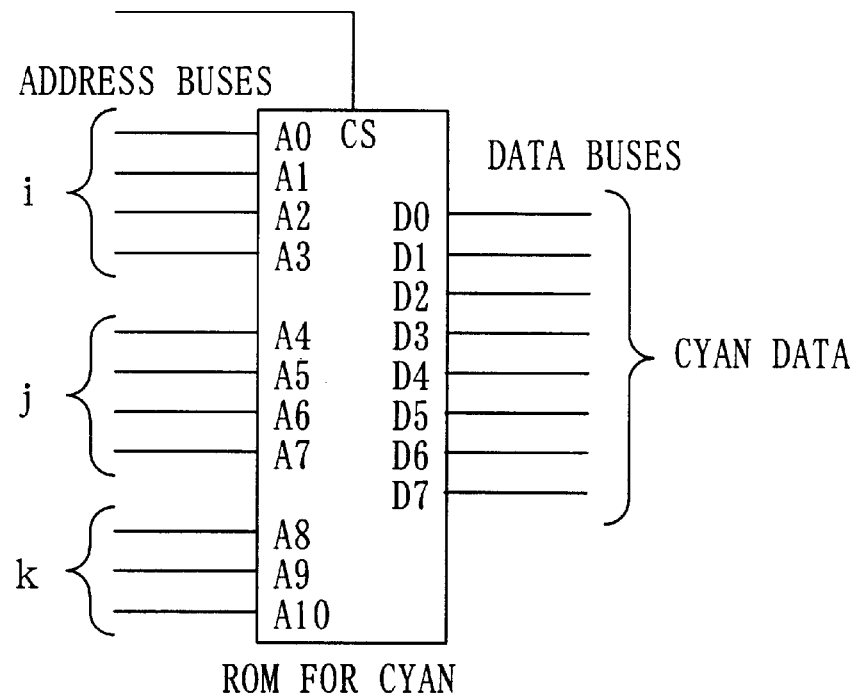
FIG. 22 shows the structure of a color correction table in the hardware configuration as an example.
Figure 23:
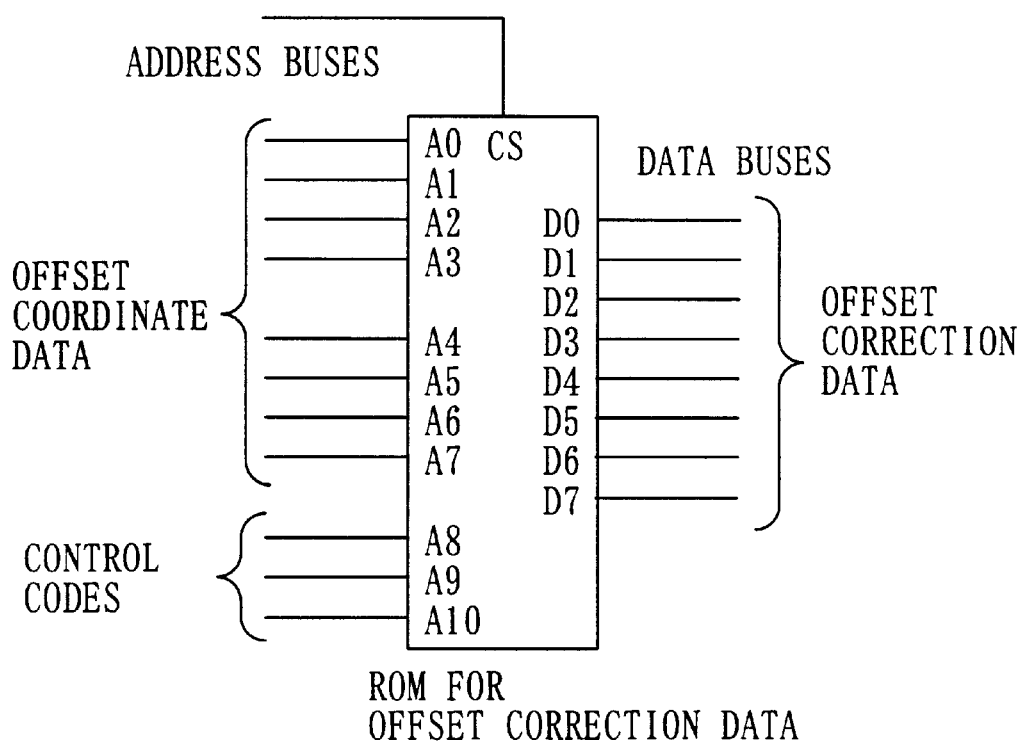
FIG. 23 shows the structure of an offset correction table in the hardware configuration as an example.

FIG. 22 shows the structure of a color correction table in the hardware configuration as an example. The example of FIG. 22 stores a color correction table for cyan in the ROM and assigns predetermined address buses to lattice point numbers (ir,ig,ib) of the lattice points in the R, G, and B directions, thereby enabling cyan correction data corresponding to specific coordinate values to be output from the data buses. Color correction tables for the other colors can be provided in the same manner. A signal line CS represents a chip select signal for controlling the validity or invalidity of a signal input into the ROM. FIG. 23 shows the structure of an offset correction table in the hardware configuration as an example. The example of FIG. 23 stores offset correction data in the ROM and assigns predetermined address buses to offset coordinate data, thereby enabling the offset correction data to be output from the data buses. Since plural types of offset correction data, that is, the lattice point specification data and the weighting coefficient data, exist corresponding to each piece of offset coordinate data, the control codes assigned to the address buses A8 through A10 in the example of FIG. 23 are used to identify the type of the offset correction data.

D. Third Embodiment

Figure 24:
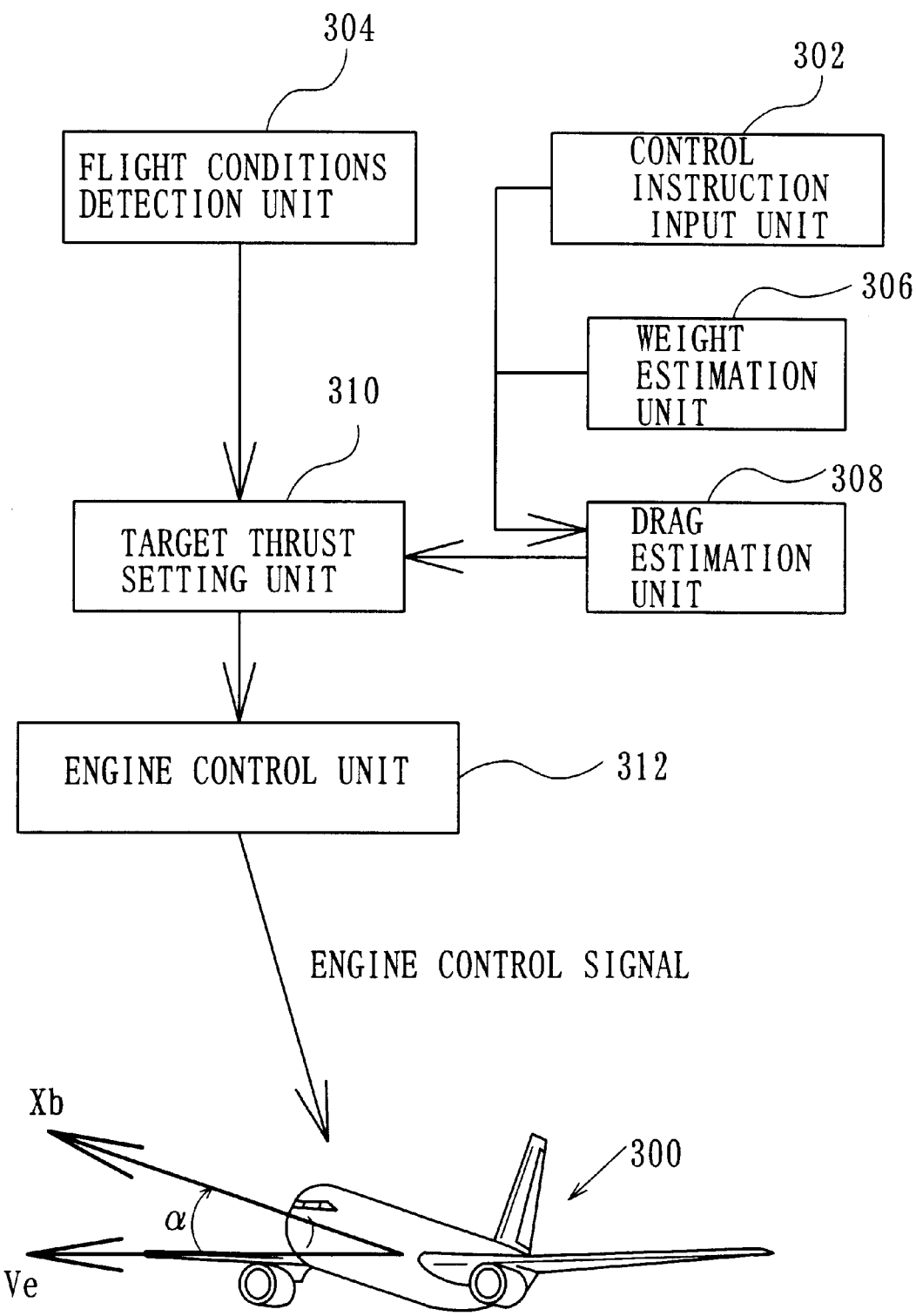
FIG. 24 is a block diagram illustrating the software structure of a flight control apparatus for an aircraft as a third embodiment of the present invention.

The principle of the present invention is applicable to a variety of apparatus other than the image processing apparatus for color correction. The following describes an application of the control method according to the present invention to a control procedure in a flight control apparatus for an aircraft as a third embodiment. FIG. 24 is a block diagram illustrating the software structure of a flight control apparatus for an aircraft. The flight control apparatus of the third embodiment includes a control instruction input unit 302, a flight conditions detection unit 304, a weight estimation unit 306, a drag estimation unit 308, a target thrust setting unit 310, and an engine control unit 312. A flight computer and sensors mounted on an aircraft 300 constitute the respective functional blocks, so as to totally function as the flight control apparatus. The flight control apparatus regulates the thrust of turbo fan engines mounted on the aircraft 300 in response to control instruction values. The flight control apparatus naturally has the function of controlling the flight attitude of the aircraft, but only the functional blocks for regulating the thrust of the engines are shown in FIG. 24 as a matter of convenience.

The flight control apparatus receives control instruction values relating to the flight conditions of the aircraft 300 via the control instruction input unit 302. The pilot may input a flight altitude and a flight speed through operation of an input panel installed in a cockpit or simply operate a steering wheel and a throttle level, in order to give the control instruction values. The weight estimation unit 306 computes the weight of the aircraft 300. The weight is estimated, for example, by subtracting the weight of the fuel consumed from the initial flight weight.

The flight altitude, the flight speed, and the estimated weight input as the control instruction values are transferred to the drag estimation unit 308. The drag estimation unit 308 computes the drag of the aircraft 300 based on these input data. The drag is obtained as the product of a drag coefficient CD, the area of the main wing ($m^2$), and a dynamic pressure ($kgf/m^2$). The dynamic pressure is determined unequivocally according to the flight altitude and the Mach number detected by the flight conditions detection unit 304 of the aircraft 300. The drag coefficient CD is a dimensionless amount obtained by interpolating a table according to the flight speed and a lift coefficient CL of the aircraft. The lift coefficient CL is a dimensionless amount obtained by dividing the weight of the aircraft by the area of the main wing and the dynamic pressure. The lift coefficient CL varies according to the angle of attack $\alpha$ in flight, that is, the angle of a fuselage axis Xb and a velocity vector Ve.

Figure 25:
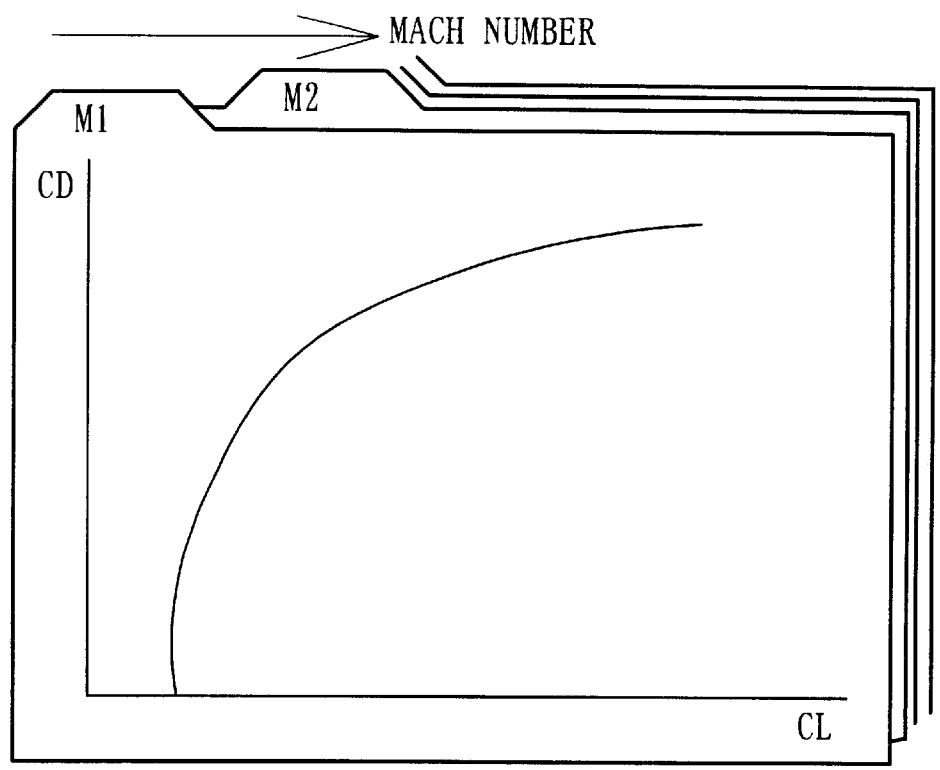
FIG. 25 is a graph showing the drag coefficient CD plotted against the lift coefficient CL with respect to various Mach numbers.
Figure 26:
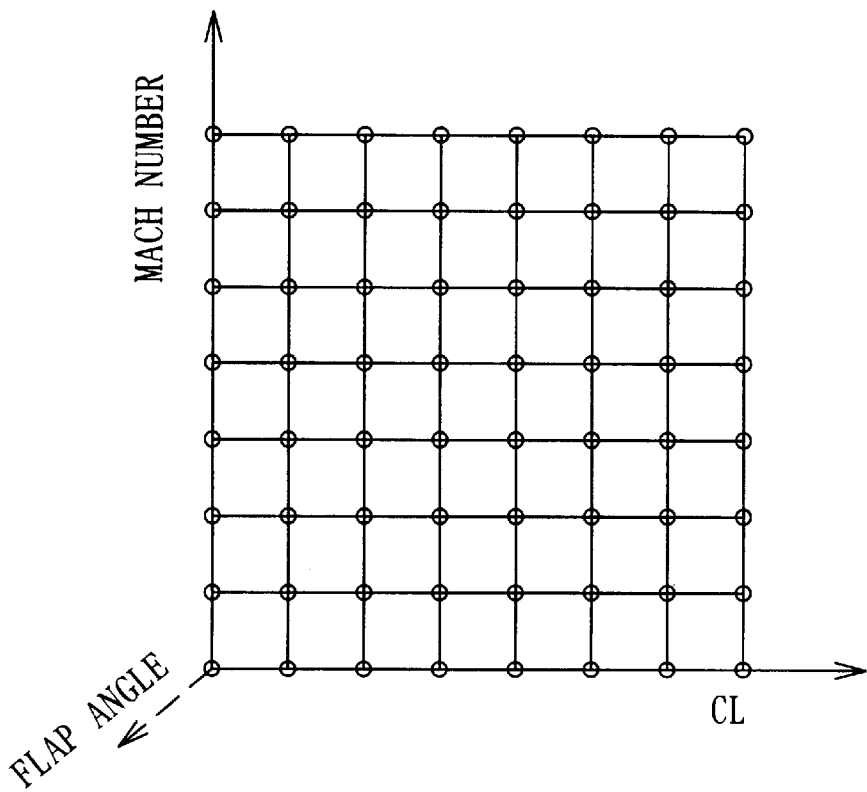
FIG. 26 shows a table used for specifying the drag coefficient CD.

The method of computing the drag coefficient CD is described with the drawings of FIGS. 25 and 26. FIG. 25 is a graph showing the relationship between the Mach number, the lift coefficient CL, and the drag coefficient CD with respect to the aircraft 300. The curve shown in FIG. 25 represents the drag coefficient CD plotted against the lift coefficient CL at a Mach number M1. The curve varies according to the Mach number. Namely the drag coefficient CD is unequivocally determined by specifying the two parameters, the lift coefficient CL and the Mach number. The flight control apparatus of the embodiment stores such graphs in the form of a table. FIG. 26 shows the image of the table used in this embodiment. The table of this embodiment defines the lattice points that discretely exist in the two-dimensional coordinate space of the lift coefficient CL and the Mach number and stores the drag coefficient CD at each lattice point. The drag coefficient CD is determined by interpolating this table according to the lift coefficient CL and the Mach number.

Although both the lift coefficient CL and the Mach number continuously vary, it is assumed in this embodiment that the lift coefficient CL varies stepwise by the unit of 0.01 and the Mach number by the unit of 0.01M. This is because the smaller values than these units are not significant when the resolving power of the detection of the sensors, the estimation accuracy of the weight, and the effect on the drag are taken into account. The lattice points shown in FIG. 26 are set at equal intervals, which are greater than these minimum units. Concretely the lattice points are arranged at the interval of 0.1 for the lift coefficient CL and the interval of 0.1M for the Mach number.

This embodiment provides an offset correction table that is used for interpolating the two-dimensional table of the drag coefficient CD. The contents of the offset correction table used in the third embodiment are similar to those of the offset correction table discussed in the first embodiment. The offset correction table of the first embodiment stores the weighting coefficients, which are multiplied in the interpolation process, and the lattice point specification data, which specify the lattice points used for the interpolation, corresponding to the offset coordinates of R, G, and B. The offset correction table of the third embodiment, on the other hand, stores the weighting coefficients and the lattice point specification data corresponding to the lift coefficient CL and the Mach number. As discussed previously, one tenth of the lattice point interval corresponds to the minimum units of the lift coefficient CL and the Mach number. The offset correction table accordingly stores the weighting coefficients and the lattice point specification data with respect to 10×10 combinations of the lift coefficient CL and the Mach number.

The structure of the third embodiment utilizes this offset correction table and carries out interpolation of the drag data. The process first executes the processing that is similar to that of FIGS. 10 and 11 and converts the lift coefficient CL and the Mach number into the coordinates of a lattice point shown in FIG. 26, that is, the base point and the offset coordinates. The first embodiment carries out the conversion of the coordinates in the three-dimensional space of R, G, and B. The only difference from the first embodiment is that the third embodiment carries out the conversion of the coordinates in the two-dimensional space of the lift coefficient CL and the Mach number. The process then refers to the offset correction table and reads the lattice point specification data and the weighting coefficients corresponding to the offset coordinates. The process subsequently multiplies the drag coefficients CD stored at the respective lattice points specified by the lattice point specification data by the weighting coefficients, so as to determine the drag coefficient CD corresponding to the input flight altitude and the Mach number. The drag estimation unit 308 multiplies the drag coefficient CD thus determined by the area of the main wing ($m^2$) and the dynamic pressure ($kgf/m^2$) and thereby estimates the drag kgf) of the aircraft 300 flying under the conditions of the input flight altitude and the Mach number.

Although this embodiment utilizes the two-dimensional table for storing the drag coefficient CD, the two-dimensional table may be replaced by a three-dimensional table including the flap angle as another element as shown in FIG. 26.

The flight conditions detection unit 304 detects the parameters relating to the flight conditions of the aircraft 300. The available parameters include the current flight altitude, the flight Mach number, and the current throttle rating. The throttle rating (%) is a parameter for regulating the engine thrust and is related to the angle of a throttle lever. These data and the drag estimated by the drag estimation unit 308 are transferred to the target thrust setting unit 310. The target thrust setting unit 310 determines a target thrust, which is used to shift the flight conditions of the aircraft 300 to the flight altitude and the Mach number input by the control instruction input unit 302, in the following manner.

Figure 27:
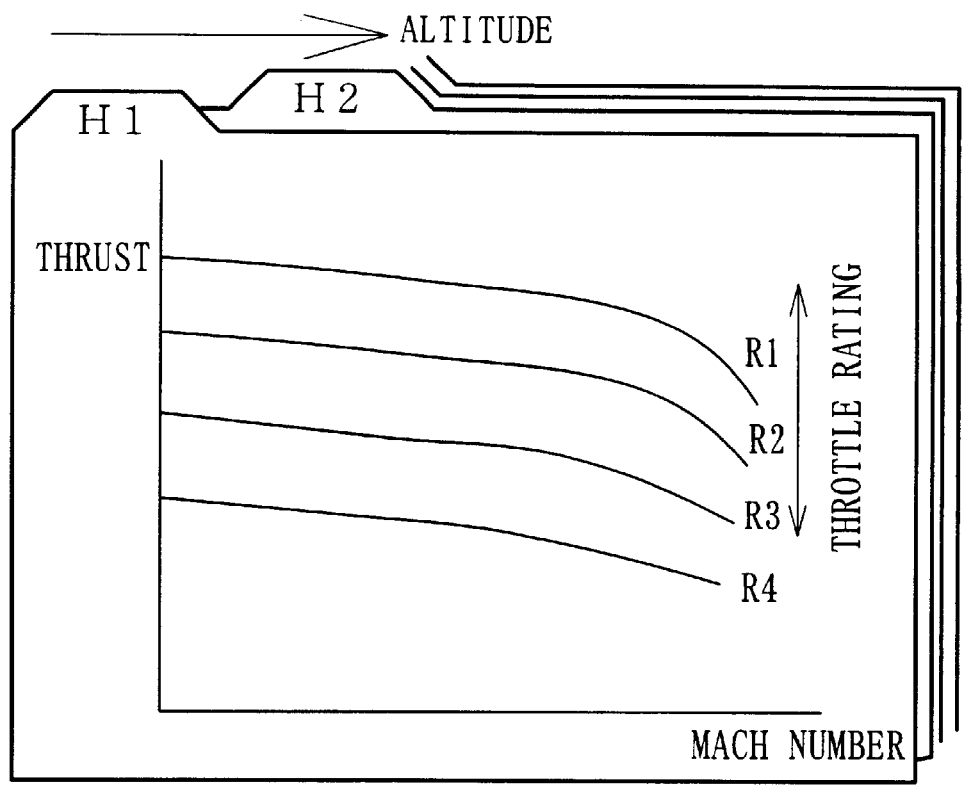
FIG. 27 is a graph showing the thrust-Mach number curves at various throttle ratings with respect to various altitudes.

The target thrust setting unit 310 determines the current engine thrust based on the data transferred from the flight conditions detection unit 304. The engine thrust is determined by interpolating the table shown in FIG. 27. The graph of FIG. 27 shows the thrust-Mach number curves at a variety of throttle ratings at an altitude H1(ft). The throttle rating decreases in the sequence of R1, R2, R3, and R4, and the thrust decreases with the decrease in throttle rating. The thrust of the turbo fan engines is determined unequivocally by specifying the flight altitude, the Mach number, and the throttle rating of the aircraft.

Figure 28:
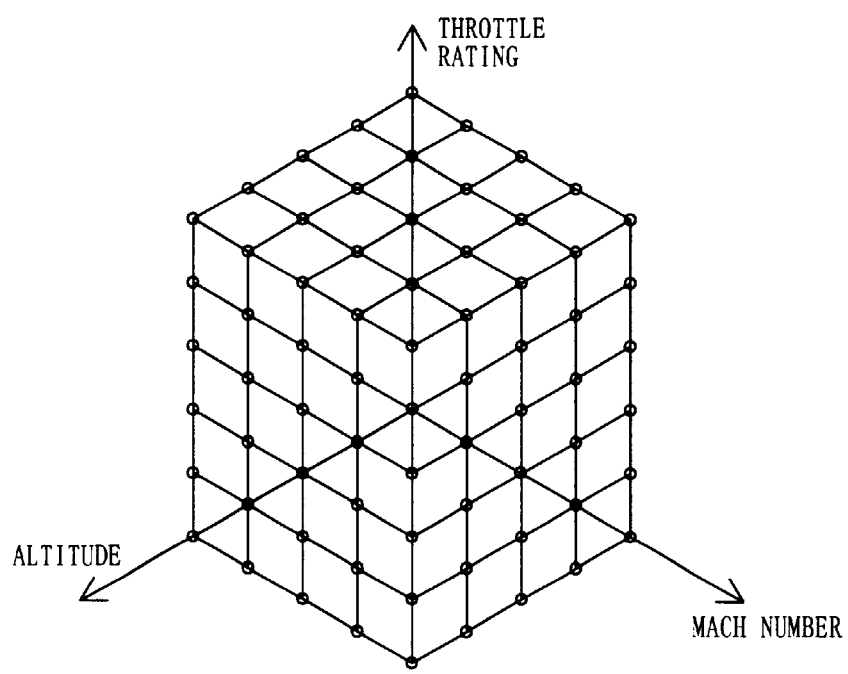
FIG. 28 shows a table used for specifying the thrust.

FIG. 28 shows the image of the table used in this embodiment. The table of this embodiment defines the lattice points that discretely exist in the three-dimensional coordinate space of the altitude, the Mach number, and the throttle rating and stores the thrust at each lattice point. The thrust is determined by interpolating the three-dimensional table according to the combination of the altitude, the Mach number, and the throttle rating.

Although all these values continuously vary, it is assumed in this embodiment that the altitude varies stepwise by the unit of 1000 ft, the Mach number by the unit of 0.01M, and the throttle rating by the unit of 1%. This is because of the same reason discussed for the interpolation of the drag coefficient CD. The lattice points shown in FIG. 28 are set at equal intervals, which are greater than these minimum units. This embodiment provides an offset correction table that is used for interpolating the three-dimensional table of the thrust. The contents of the offset correction table used in this embodiment are similar to those of the offset correction table discussed in the first embodiment. The offset correction table used here stores the weighting coefficients, which are multiplied in the interpolation process, and the lattice point specification data, which specify the lattice points used for the interpolation, corresponding to the altitude, the Mach number, and the throttle rating.

This embodiment utilizes this offset correction table to determine the thrust according to the technique discussed in the first embodiment. The process first converts the flight altitude, the Mach number, and the throttle rating into the coordinates of a lattice point shown in FIG. 28, that is, the base point and the offset coordinates. The process then refers to the offset correction table and reads the lattice point specification data and the weighting coefficients corresponding to the offset coordinates. The process subsequently multiplies the thrusts stored at the respective lattice points specified by the lattice point specification data by the weighting coefficients, so as to determine the thrust corresponding to the flight altitude, the Mach number, and the throttle rating. This value represents the observed thrust under the current flight conditions.

The target thrust setting unit 310 sets a target thrust based on a deviation of the observed thrust under the current flight conditions from the calculated thrust under the input flight conditions as the instruction values. When the aircraft 300 flies in a stationary state, the thrust balances the drag, so that the calculated thrust is equal to the drag computed by the drag estimation unit 308. The target thrust is specified by proportional-plus-integral control. This technique multiplies the deviation of the observed thrust from the calculated thrust by a predetermined gain, so as to set the target thrust. The technique of proportional-plus-integral control is known in the art and not specifically described here. The target thrust set in this manner is then transferred to the engine control unit 312.

The engine control unit 312 sets the throttle rating of the engine based on the input target thrust. The throttle rating is set by interpolating the table shown in FIGS. 27 and 28. The altitude and the Mach number used for the interpolation are the current flight conditions detected by the flight conditions detection unit 304. In this embodiment, the thrust monotonously increases with an increase in throttle rating at a specified altitude and Mach number as shown in the graph of FIG. 27. The process interpolates the table of FIG. 28 and determines the thrust while gradually varying the throttle rating. This enables the target value of the throttle rating to be set relatively easily. The interpolation technique discussed for the target thrust setting unit 310 is applied for the interpolation. Another procedure interpolates the table that stores the throttle rating at each lattice point specified by the altitude, the Mach number, and the thrust.

The flight control apparatus of the third embodiment adopts the control method of the present invention and realizes the extremely high-speed interpolation of the drag coefficient CD and the engine data. This enables the appropriate control of the aircraft 300 with a less time delay.

The above description regards the flight control apparatus for the aircraft 300. The control method of the present invention is not restricted to such flight control but is applicable to any control operation that utilizes a table for storing parameters relating to the control. The plant or the object to be controlled may be any machines and apparatuses including a variety of engines, transport equipment, and industrial machinery other than the aircraft. The plant may be electrically-driven apparatuses, such as audio equipment, as well as the mechanically-driven apparatuses. The control method of the present invention is also applicable to simulators that simulate the operations of various equipment as well as to control apparatuses of these equipment.

E. Fourth Embodiment

Figure 29:
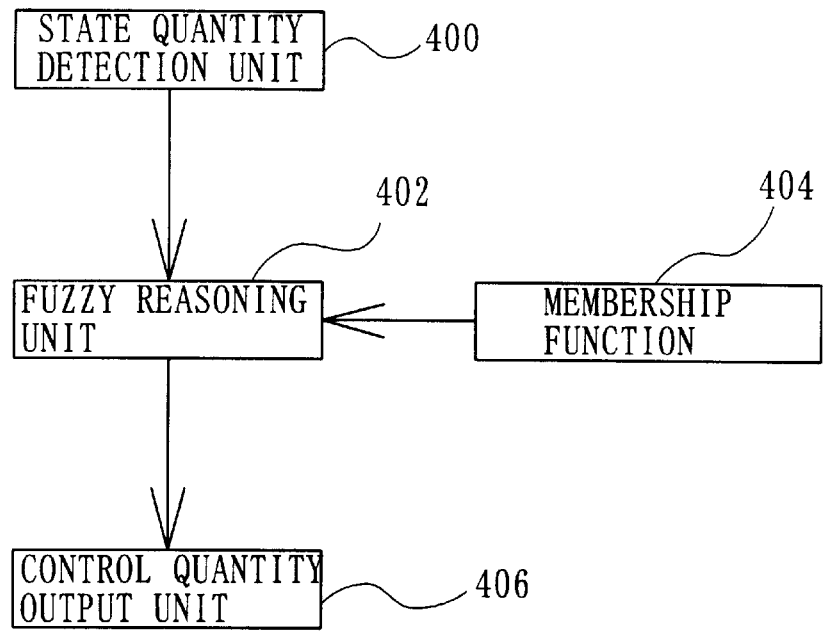
FIG. 29 is a block diagram illustrating the software structure of a fuzzy control apparatus as a fourth embodiment of the present invention.

The following describes an application of the control method according to the present invention to a fuzzy control apparatus as a fourth embodiment. FIG. 29 is a block diagram illustrating the software structure of a fuzzy control apparatus. The CPU and memories mounted on the control apparatus constitute the respective functional blocks, so as to totally function as the fuzzy control apparatus. Like the control apparatus of the third embodiment, the fuzzy control apparatus of this embodiment may have any plant or object to be controlled. For convenience of explanation, the following describes an example where a vehicle is the plant or the object of control.

The fuzzy control apparatus of the fourth embodiment includes a state quantity detection unit 400, a fuzzy reasoning unit 402, a membership function 404, and a control quantity output unit 406. The state quantity detection unit 400 detects the current state quantity of the plant. The state quantities represent parameters relating to the control. When the vehicle is the plant or the object to be controlled, for example, the vehicle speed, the distance from the vehicle in front, and the acceleration of the vehicle are the available state quantities. The observed state quantity is transferred to the fuzzy reasoning unit 402.

The fuzzy reasoning unit 402 refers to the membership function 404 and specifies control quantity corresponding to the observed state quantity by fuzzy reasoning. The fuzzy reasoning specifies the control quantity based on a fuzzy parameter including uncertainty. By way of example, when the vehicle is the plant, the fuzzy reasoning unit 402 carries out the control like 'accelerate in the case of the slow vehicle speed'. This fuzzy control does not make the vehicle speed coincident with a specific velocity but utilizes the fuzzy parameter of 'slow'.

Figure 30:
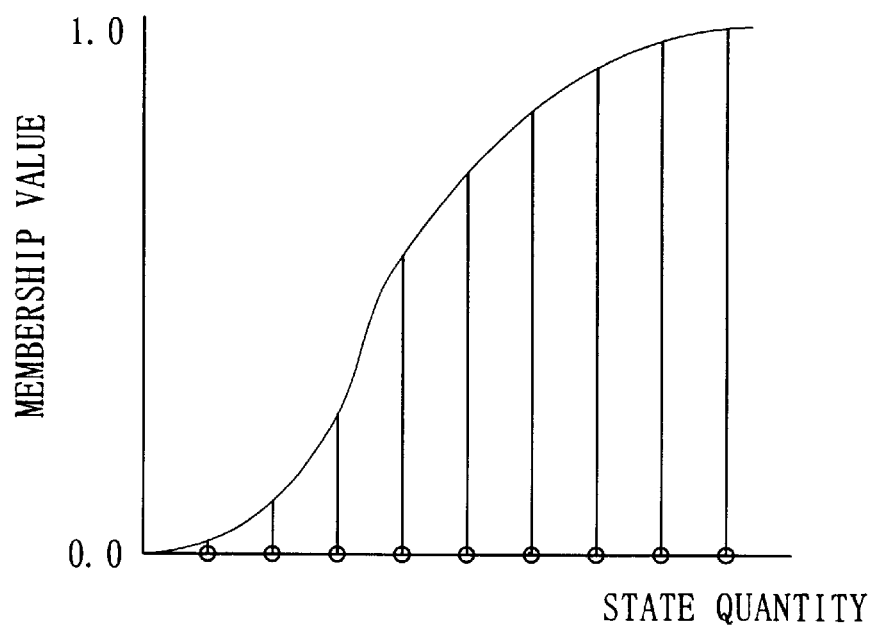
FIG. 30 shows a table used for specifying the membership value.

The membership function mathematically expresses such a fuzzy parameter. FIG. 30 shows an example of the membership function. The membership function of FIG. 30 gives the membership value of 0 to 1.0 against the state quantity. The membership function is defined, for example, by the vehicle speed plotted as abscissa and the probability of the recognition 'fast' as ordinate. The state quantity plotted as abscissa is determined according to the object to be controlled and the parameter used for evaluation by fuzzy reasoning. When both the vehicle speed and the distance from the vehicle in front are taken into account for the control, another membership function is further provided, where the distance from the vehicle in front is plotted as abscissa and the probability of the recognition 'insufficient distance from the vehicle in front' as ordinate. The membership function may be a two-dimensional function that gives the membership value against the two or more state quantities. This embodiment utilizes the one-dimensional table that stores the membership value corresponding to the lattice point as shown in FIG. 30. Although the state quantity continuously varies, it is assumed that the state quantity varies stepwise by a predetermined minimum unit because of the reason discussed in the third embodiment. The lattice points of FIG. 30 are arranged at an equal interval that is greater than the minimum unit.

The fuzzy reasoning unit 402 interpolates the membership function and determines the membership value corresponding to the observed state quantity. This embodiment provides an offset correction table that is used for interpolating the membership function. The contents of the offset correction table used in this embodiment are similar to those of the offset correction table discussed in the first embodiment. The offset correction table used here stores the weighting coefficients, which are multiplied in the interpolation process, and the lattice point specification data, which specify the lattice points used for the interpolation, corresponding to the state quantity.

This embodiment utilizes this offset correction table to determine the membership value according to the technique discussed in the first embodiment. The process first converts the state quantity into the base point and the offset coordinates. The process then refers to the offset correction table and reads the lattice point specification data and the weighting coefficients corresponding to the offset coordinates. The process subsequently multiplies the membership values stored at the respective lattice points specified by the lattice point specification data by the weighting coefficients, so as to determine the state quantity corresponding to the observed state quantity.

The fuzzy reasoning unit 402 specifies the control quantity based on the membership value thus determined. For example, when the vehicle is controlled under the rule of 'accelerate in the case of the slow vehicle speed and the sufficient distance from the vehicle in front', the process specifies the membership value based on the vehicle speed and the distance from the vehicle in front detected as the state quantities. The process then determines, based on the specified membership value, whether or not the above condition is fulfilled, and thereby determines whether or not the vehicle is to be accelerated. The degree of acceleration may further be specified by another membership function. The details of the fuzzy reasoning are not the essential part of this embodiment and are thus not specifically described here. The control quantity thus specified is transferred to the control quantity output unit 406. The control quantity output unit 406 outputs a control signal corresponding to the specified control quantity and controls the plant. When the vehicle is the plant, the control quantity may be the accelerator position. In this case, the control quantity output unit 406 regulates the accelerator position to control the vehicle speed.

Application of the control method of the present invention improves the rate of interpolation of the membership function. The interpolation of the membership function is frequently carried out in the fuzzy control. Application of the control method of the present invention to the interpolation of the membership function as described above thus realizes the extremely high-speed fuzzy control. This is especially effective when the membership function is a two- or greater-dimensional function.

F. Fifth Embodiment

Figure 31:
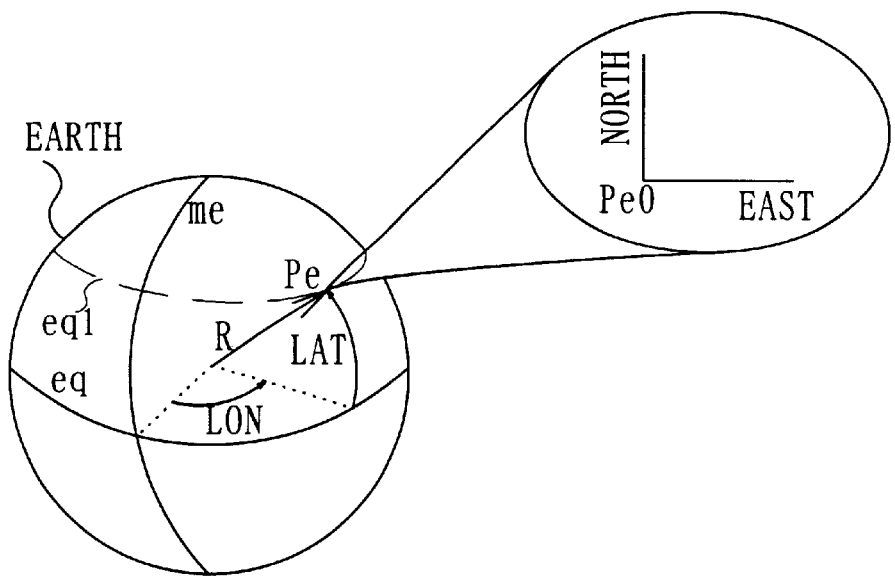
FIG. 31 shows coordinates conversion as a fifth embodiment of the present invention.

The following describes an application of the control method according to the present invention to control an apparatus that requires coordinates conversion as a fifth embodiment. The fifth embodiment regards the coordinates conversion of a polar coordinate system into an orthogonal coordinate system as shown in FIG. 31. In the drawing of FIG. 31, eq, me, Pe, LAT, LON, and R respectively denote the equator, the 0-degree longitude line, a point on the earth, the latitude (rad) and the longitude (rad) of the point Pe, and the radius of the earth. As illustrated in FIG. 31, the latitude and the longitude on the earth are polar coordinates. The directions of north, south, east, and west at a specific point on the earth can be approximated by orthogonal coordinates.

FIG. 31 shows the coordinates conversion of the latitude and the longitude into the orthogonal coordinates specified by directions from a specific point PeO on the earth as the origin. Such coordinates conversion is used, for example, in a navigation system that takes into advantage of the global positioning system hereinafter referred to as GPS). As is known, GPS is the system that specifies the position on the earth based on the signals from the artificial satellite. GPS specifies the position on the earth by the latitude, the longitude, and the altitude. When display of a map is controlled in the navigation system, it is desirable to specify the position in the coordinate system on the map defined by the directions of north, south, east, and west. In the example discussed here, it is assumed that the navigation system is mounted on the vehicle and that the altitude is kept constant.

The latitude and the longitude are converted into the coordinates in the orthogonal coordinate system defined by the axes of east direction and north direction from the specific point Pe0 on the earth as the origin. The latitude (rad) and the longitude (rad) of the point Pe0 are expressed as (LAT0,LON0). A distance Le in the east-west direction between the point Pe0 and another point Pe1 (LAT0,LON1) that are present on the same latitude is specified as the arc of the latitude line LAT0 (see the broken line eq1 in FIG. 31) by Equation (18) given below:

$$Le=R\cdot(LON1-LON0)\cdot\cos(LAT0) \qquad (18)$$

When the difference in latitude is small between the two points existing on different latitudes, the distance in the east-west direction can be approximated by Equation (18) given above.

A distance Ln in the north-south direction between the point Pe0 and another point Pe2 (LAT1,LON0) that are present on the same longitude is specified as the arc of the longitude line by Equation (19) given below:

$$Ln=R\cdot(LAT1-LAT0) \qquad (19)$$

Equation (19) can be held between the two points existing on different longitudes.

An arbitrary point Pe (LAT1,LON1) on the earth expressed by arbitrary latitude and longitude is specified as (Le,Ln) using the distances Le and Ln given by Equations (18) and (19) in the orthogonal coordinate system, which is defined by the axes of north direction and east direction from the specific point PeO as the origin.

Figure 32:
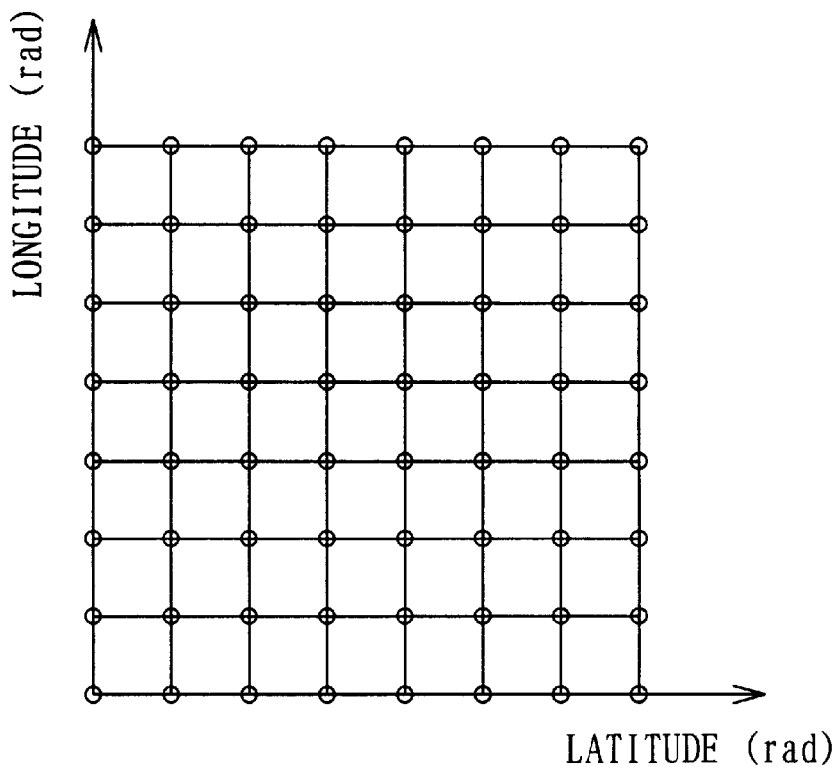
FIG. 32 shows a table used for specifying the values in an orthogonal coordinate system corresponding to a specific combination of latitude and longitude.

This embodiment implements the coordinates conversion by the control method of the present invention. FIG. 32 shows the image of the table used in this embodiment. The coordinates conversion method of this embodiment specifies a plurality of lattice points by the combinations of latitude and longitude as shown in FIG. 32 and provides a table that stores the values Le and Ln in the orthogonal coordinate system at the respective lattice points. The method interpolates this table and thereby determines the values Le and Ln in the orthogonal coordinate system corresponding to the arbitrary latitude and longitude.

The interpolation of the table shown in FIG. 32 follows the interpolation technique of the first embodiment discussed with the flowcharts of FIGS. 9 through 11. The interpolation technique provides an offset interpolation table that stores the weighting coefficients, which are multiplied in the interpolation process, and the lattice point specification data, which specify the lattice points used for the interpolation, corresponding to the combinations of the latitude and the longitude. In order to provide the offset interpolation table, it is assumed that the latitude and the longitude are not continuously varying real numbers but vary stepwise by minimum units. The minimum units are specified according to the accuracy required for the coordinates conversion. The process converts the coordinates of the latitude and the longitude into the base point and the offset coordinates, refers to the offset correction table, and reads the weighting coefficients and the lattice point specification data corresponding to the offset coordinates. The process multiplies the coordinates Le and Ln, which are stored at the respective lattice points specified by the lattice point specification data, by the weighting coefficients and thereby carries out the coordinates conversion.

Equations (18) and (19) of the coordinates conversion are not linear. The interpolation of the table for coordinates conversion accordingly results in some error. The error varies according to the lattice point interval of the table shown in FIG. 32. A sufficiently small value is accordingly set to the lattice point interval of the table, based on the accuracy required for the coordinates conversion. This arrangement favorably reduces the error.

The data interpolation technique of the embodiment enables the extremely high-speed coordinates conversion. Equation (18) includes a trigonometric function. The trigonometric function generally requires a relatively long time for calculation. The method of this embodiment realizes the high-speed coordinates conversion and thereby has the following advantages. The coordinates conversion is frequently repeated in control operations in the navigation system. The high-speed coordinates conversion thus significantly improves the speed of the whole processing. In the navigation system, it is necessary to carry out the real-time coordinates conversion. The coordinates conversion method of this embodiment enables this requirement.

This embodiment regards the coordinates conversion on the surface of the earth while keeping the altitude constant. It is possible to convert the three-dimensional polar coordinates of the latitude, the longitude, and the altitude into the three-dimensional orthogonal coordinate system defined by the axes of east direction, north direction, and altitude. The embodiment discussed above refers to the case where the origin of the polar coordinates is different from the origin of the orthogonal coordinates. The coordinates conversion method of the embodiment is, however, naturally applicable to the case where both the origins coincide with each other. The coordinates conversion method of this embodiment is applicable to conversion between any coordinate systems other than the conversion between the polar coordinates and the orthogonal coordinates.

G. Sixth Embodiment

The following describes an application of the control method according to the present invention to control an apparatus that requires linear conversion as a sixth embodiment. The linear conversion is a kind of the coordinates conversion and allows the relationship between the coordinates before the conversion and the coordinates after the conversion to be expressed with a matrix. The parallel displacement and the rotation in the coordinate system are typical examples of linear conversion. This embodiment regards the rotation in the orthogonal coordinate system.

Figure 33:
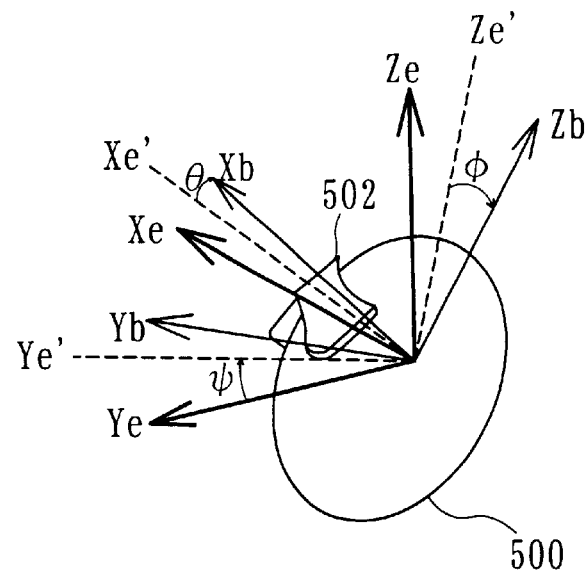
FIG. 33 shows linear conversion as a sixth embodiment of the present invention.

By way of example, the control procedure based on the linear conversion technique by the rotation in the orthogonal coordinate system is required for an apparatus that takes advantage of the technology of virtual reality (hereinafter referred to as VR). FIG. 33 shows the coordinates conversion used for the VR technique. A subject 500 of the VR technique has a head-mounted display (hereinafter referred to as the HMD) 502 on the head thereof The VR technique converts the coordinates of an image in a virtual space according to the head angle of the subject 500 and projects the converted image on the HMD 502. The subject 500 looks at the video images projected on the HMD 502 and simulates the movements in the virtual space. The VR technique may carry out the coordinates conversion in combination with the parallel displacement of the subject 500.

The rotation in the three-dimensional orthogonal coordinate system is generally defined by angles $\psi$ (rad), $\theta$ (rad), and $\phi$ (rad) called Euler angles. As shown in FIG. 33, the orthogonal coordinate system fixed to the earth is expressed as Xe, Ye, and Ze, whereas the orthogonal coordinate system fixed to the subject 500 is expressed by Xb, Yb, and Zb. The relationship between these orthogonal coordinate systems can be specified by the Euler angles $\psi$, $\theta$, and $\phi$ defined below.

The orthogonal coordinate system Xe, Ye, Ze fixed to the earth is rotated about the Ze axis by $\psi$ (rad). This converts the coordinate system Xe, Ye, Ze into another coordinate system Xe', Ye', Ze shown in FIG. 33. The Euler angle $\psi$ (rad) represents the angle that enables the projection of the coordinate axis Xb fixed to the subject 500 on the Xe-Ye plane in the earth coordinate system to overlap the coordinate axis Xe'.

The coordinate system Xe', Ye', Ze is then rotated about the Ye' axis by $\theta$ (rad). This converts the coordinate system Xe', Ye', Ze into still another coordinate system Xb, Ye', Ze'. The Euler angle $\theta$ (rad) represents the angle that enables the Xb axis to coincide with the Xe' axis.

The coordinate system Xb, Ye', Ze' is finally rotated about the Xb axis by $\phi$ (rad). This converts the coordinate system Xb, Ye', Ze' into the coordinate system Xb, Yb, Zb fixed to the subject 500. The Euler angle $\phi$ (rad) represents the angle that enables the Yb axis to coincide with the Yb' axis.

Conversion of coordinates (xe,ye,ze) in the coordinate system fixed to the earth into coordinates (xb,yb,zb) in the coordinate system fixed to the subject is expressed by Equations (20) given blow. Namely the coordinates conversion is implemented by specifying nine elements a11 through a33 that depend upon the Euler angles $\psi$, $\theta$, and $\phi$.

$$\begin{aligned} xb &= \sin\theta\cos\psi \cdot xe + (-\sin\theta\sin\psi) \cdot ye + \cos\theta \cdot ze \\ &= a11 \cdot xe + a12 \cdot ye + a13 \cdot ze; \\ yb &= (-\sin\phi\cos\theta\cos\psi + \cos\phi\sin\psi) \cdot xe + \\ &\quad (-\sin\phi\cos\theta\sin\psi + \cos\phi\cos\psi) \cdot ye + \sin\phi\sin\theta \cdot ze \\ &= a21 \cdot xe + a22 \cdot ye + a23 \cdot ze; \\ zb &= (\cos\phi\cos\theta\cos\psi + \sin\phi\sin\psi) \cdot xe + \\ &\quad (-\cos\phi\cos\theta\sin\psi + \sin\phi\cos\psi) \cdot ye + (-\cos\phi\sin\theta) \cdot ze \\ &= a31 \cdot xe + a32 \cdot ye + a33 \cdot ze \end{aligned} \quad (20)$$

Figure 34:
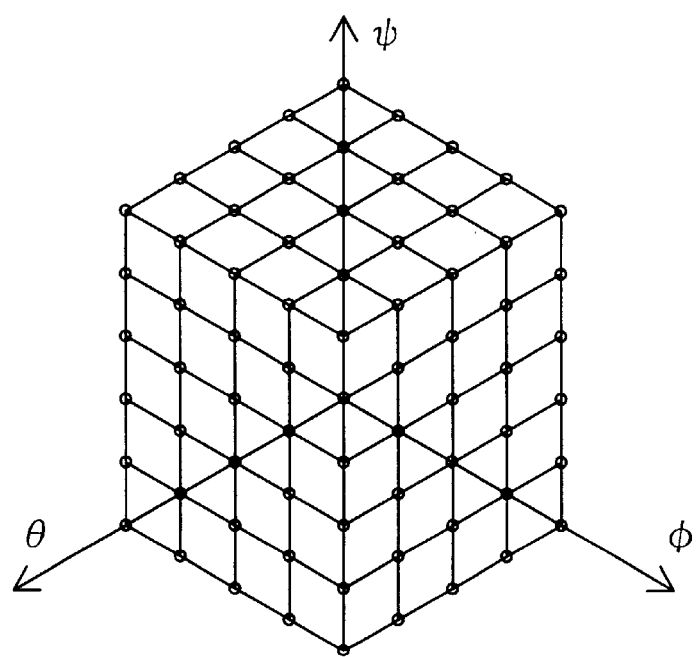
FIG. 34 shows a table used for specifying the elements of linear conversion corresponding to the Euler angles.

As clearly understood from Equations (20), the elements a11 through a33 can be calculated by trigonometric functions of the Euler angles. The method of this embodiment, on the other hand, interpolates a table to determine these elements. FIG. 34 shows the image of the table used in this embodiment. The method of this embodiment specifies a plurality of lattice points by the combinations of the Euler angles $\psi$, $\theta$, and $\phi$ and provides a table that stores the nine elements all through a33 at the respective lattice points. The method provides an offset correction table used for the interpolation of the table of FIG. 34. Like the other embodiments, the offset correction table of this embodiment stores the weighting coefficients, which are multiplied in the interpolation process, and the lattice point specification data, which specify the lattice points used for the interpolation. In order to provide the offset interpolation table, it is assumed that the Euler angles are not continuously varying real numbers but vary stepwise by minimum units.

This embodiment interpolates the table shown in FIG. 34 by the method discussed in the above embodiments. The process converts the coordinates defined by the combination of the Euler angles $\psi$, $\theta$, and $\phi$ into the base point and the offset coordinates, refers to the offset correction table, and reads the weighting coefficients and the lattice point specification data corresponding to the offset coordinates. The process multiplies the elements a11 through a33, which are stored at the respective lattice points specified by the lattice point specification data, by the weighting coefficients and thereby calculates the elements a11 through a33 corresponding to the Euler angles $\psi$, $\theta$, and $\phi$. Substitution of the elements a11 through a33 thus calculated into Equations (20) enables the conversion of the coordinate system Xe, Ye, Ze fixed to the earth into the coordinate system Xb, Yb, Zb fixed to the subject 500.

The data interpolation technique of this embodiment realizes the high-speed linear conversion of the coordinate system. The VR technique requires the frequent and real-time linear conversion. The linear conversion by the method of the embodiment is thus extremely effective for the VR technique. The linear conversion of the embodiment is favorably applied to any control operations that include the linear conversion, other than the VR technique. This improves the speed of the whole control operations.

As clearly understood from Equations (20), the respective elements a11 through a33 are not the linear functions of the Euler angles $\psi$, $\theta$, and $\phi$. The interpolation of the table shown in FIG. 34 accordingly results in some error. The error varies according to the lattice point interval of the table shown in FIG. 34. A sufficiently small value is accordingly set to the lattice point interval of the table, based on the accuracy required for the coordinates conversion. This arrangement favorably reduces the error.

Although this embodiment regards the application to the VR technique, the control method is applicable to a variety of other control operations that require the linear conversion. This control method is also applicable to a variety of coordinate systems as well as the orthogonal coordinate system. The target coordinate space is not restricted to the three-dimensional system. This embodiment describes the rotation in the coordinate system as an example. The method of this embodiment is also applicable to the linear conversion including the parallel displacement.

The present invention is not restricted to the above embodiments or their applications, but there may be many modifications, changes, and alterations without departing from the scope or spirit of the main characteristics of the present invention. For example, the hardware configurations shown in FIGS. 22 and 23 may be applicable to all the other embodiments as well as the first and the second embodiments.

It should be clearly understood that the above embodiments are only illustrative and not restrictive in any sense. The scope and spirit of the present invention are limited only by the terms of the appended claims.

What is claimed is:

1. An image processing apparatus that carries out color correction of a multi-color image and outputs the color-corrected image, the multi-color image being expressed by coordinates that correspond to predetermined numbers of tones in three dimensions in a color space, said image processing apparatus comprising:

an input unit configured to input color image data specified by a specific combination of coordinates with respect to each pixel included in the multi-color image;

a first memory configured to store lattice point information in the form of a lattice point information table, said lattice point information including coordinates of lattice points that are obtained by dividing said color space by a predetermined number in each dimension, which is smaller than a number of tones in each dimension;

a second memory configured to store color correction data, which relate to a quantity of color correction, corresponding to each lattice point in the from of a color correction table;

a lattice division identification unit configured to identify a specific lattice division in which the color image data is included, among a plurality of lattice divisions defined by adjoining lattice points in the three dimensions of said color space, based on the lattice point information;

an image data conversion unit configured to convert the color image data into coordinates of a reference lattice point, which represents a base point among lattice points constituting the specific lattice division, and offset coordinates, which represent a deviation of the color image data from the coordinates of the reference lattice point in the three dimensions;

a third memory configured to store interpolation data including lattice point specification data and weighting coefficient data, which are required for interpolating said color correction table and specifying color correction data corresponding to the color image data, corresponding to the offset coordinates in the form of an offset correction table, the lattice point specification data specifying at least part of four lattice points used for interpolation, the weighting coefficient data determining values multiplied by color correction data corresponding to the four lattice point; and a color correction unit configured to read interpolation data corresponding to the offset coordinates from said offset correction table, read color correction data corresponding to the reference lattice point and predetermined lattice points adjoining to the reference lattice point from said color correction table, carry out interpolation of the color correction data with the interpolation data, and output a result of the interpolation as corrected color image data, wherein the image processing apparatus uses the offset correction table so the interpolation is performed without conditional jumps so as to attain high-speed image processing.

2. An image processing apparatus in accordance with claim 1, wherein the division of said color space causes an amount of the color correction data stored as said color correction table to be substantially equal to an amount of the interpolation data stored as said offset correction table.

3. An image processing apparatus in accordance with claim 1, wherein the lattice point specification data specifies two lattice points used for interpolation, according to the offset coordinates, the weighting coefficient data corresponds to the two lattice points, the base point, and the opposite lattice point the base point.

4. An image processing apparatus in accordance with claim 3, said image processing apparatus further comprising:

a normalizing unit configured to normalize the coordinates, in order to equalize intervals between adjoining lattice points in each dimension, wherein said image data conversion unit converts the color image data into the coordinates of the reference lattice point, which represents the base point among the lattice points constituting the specific lattice division, and the offset coordinates, which represent the deviation of the color image data from the coordinates of the reference lattice point in the respective dimensions by the coordinates normalized by said normalizing unit.

5. An image processing apparatus in accordance with claim 4, wherein the interval between adjoining lattice points after the normalization is an integral multiple of the interval between adjoining lattice points before the normalization in a predetermined low density area of said color space.

6. An image processing apparatus in accordance with claim 4, wherein said image data conversion unit comprises at least one of:

a reference lattice point table configured to store the coordinates of the reference lattice point, which represents the base point among the lattice points constituting the specific lattice division, according to the color image data; and an offset coordinate table configured to store the offset coordinates, which represent the deviation of the color image data from the coordinates of the reference lattice point in the respective dimensions by the coordinates normalized by said normalizing unit, according to the color image data, and wherein said image data conversion unit carries out at least one of the conversion of the color image data into the coordinates of the reference lattice point and the conversion of the color image data into the offset coordinates by referring to at least one of said reference lattice point table and said offset coordinate table.

7. A computer readable recording medium, on which a program for causing a computer to realize image processing is recorded, wherein said image processing carries out correction of a multi-color image and outputs the color-corrected image, the multi-color image being expressed by coordinates that correspond to predetermined numbers of tones in three dimension in a color space, said program causing the computer to realize the functions of:

inputting color image data specified by a specific combination of coordinates with respect to each pixel included in the multi-color image;

referring to a lattice point information table that stores lattice point information with respect to said color space, the lattice point information including coordinates of lattice points that are obtained by dividing said color space by a predetermined number in each dimension, which is smaller than a number of tones in each dimension;

referring to a color correction table that stores color correction data, which relate to a quantity of color correction, corresponding to each lattice point;

identifying a specific lattice division in which the color image data is included, among a plurality of lattice divisions defined by adjoining lattice points in the three dimensions of said color space, based on the lattice point information;

converting the color image data into coordinates of a reference lattice point, which represents a base point among lattice points constituting the specific lattice division, and offset coordinates, which represent a deviation of the color image data from the coordinates of the reference lattice point in the three dimensions;

referring to an offset correction table that stores interpolation data including lattice point specification data and weighting coefficient data, which are required for interpolating said color correction table and specifying color correction data corresponding to the color image data, corresponding to the offset coordinates, the lattice point specification data specifying at least part of four lattice points used for interpolation, the weighting coefficient data determining values multiplied by color correction data corresponding to the four lattice points; and reading interpolation data corresponding to the offset coordinates from said offset correction table, reading color correction data corresponding to the reference lattice point and predetermined lattice points adjoining to the reference lattice point from said color correction table, carrying out interpolation of the color correction data with the interpolation data, and outputting a result of the interpolation as corrected color image data, wherein the program uses the offset correction table so the interpolation is performed without conditional jumps so as to attain high-speed image processing.

8. A computer readable recording medium for recording data used in an image processing apparatus, said image processing apparatus carrying out color correction of a multi-color image with specific data and outputting the color-corrected image, the multi-color image being expressed by coordinates that correspond to predetermined numbers of tones in three dimensions in a color space, the specific data being provided corresponding to specific lattice points selected among a plurality of lattice points obtained by dividing said color space, said computer readable recording medium having stored thereon;

a lattice point information table that stores lattice point information with respect to said color space, the lattice point information including coordinates of the plurality of lattice points that are obtained by dividing the three dimensions of said color space by a predetermined number in each dimensions which is smaller than a predetermined number of tones in each dimension;

a color correction table that stores color correction data, which relate to a quantity of color correction, corresponding to each lattice point; and an offset correction table that stores interpolation data including lattice point specification data and weighting coefficient data, which are required for interpolating said color correction table and specifying color correction data corresponding to color image data, corresponding to offset coordinates, the offset coordinates represent a deviation of the color image data from coordinates of a reference lattice point in the three dimensions, and the reference lattice point represents a base point of a specific lattice division that is defined by lattice points adjoining to the color image data in the respective dimensions of said color space, the lattice point specification data specifying at least part of four lattice points used for interpolation, the weighting coefficient data determining values multiplied by color correction data corresponding to the four lattice points, wherein the image processing apparatus uses the offset correction table so the interpolation is performed without conditional jumps so as to attain high-speed image processing.

9. A computer readable recording medium in accordance with claim 8, wherein an amount of the color correction data stored as said color correction table is substantially equal to an amount of the interpolation data stored as said offset correction table.

10. A control method of carrying out a control operation of a plant by interpolating a parameter, which is related to the control operation of said plant, according to combinations of coordinates in a coordinate space of a predetermined number of dimensions, wherein values of the parameter are stored corresponding to lattice points that are present discretely in the coordinate space, said control method comprising the steps of:

(a) providing a lattice point information table, a target table of interpolation, and an offset correction table, wherein said lattice point information table stores lattice point information at respective lattices specified by combinations of coordinates that are set discretely in respective dimensions of the coordinate space, said target table of interpolation stores the values of parameter corresponding to the respective lattice points, and said offset correction table stores interpolation data including lattice point specification data and weighting coefficient data, which are required for interpolating said target table of interpolation and specifying values corresponding to input data, corresponding to the offset coordinates, the lattice point specification data specifying at least part of four lattice points used for interpolation, and the weighting coefficient data determining values multiplied by values corresponding to the four lattice points;

(b) receiving input data that represent a specific combination of coordinate values, which have been finitely set for the respective dimensions in the coordinate space;

(c) identifying a specific lattice division in which the input data is included, among a plurality of lattice divisions defined by adjoining lattice points in the respective dimensions of the coordinate space, based on the lattice point information;

(d) converting the input data into coordinates of a reference lattice point, which represents a based point among lattice points constituting the specific lattice division, and offset coordinates, which represent a deviation of the input data from the coordinates of the reference lattice point in the respective dimensions; and (e) reading interpolation data corresponding to the offset coordinates from said offset correction table, reading values of the parameter corresponding to the reference lattice point and predetermined lattice points adjoining to the reference lattice point from said target table of interpolation, and carrying out interpolation of the parameter with the interpolation data, wherein the method uses the offset correction table so the interpolation is performed without conditional jumps so as to obtain high-speed processing.

11. A control method in accordance with claim 1, wherein said plant comprises an image processing apparatus that carries out color correction of color data of an image, the input data comprises color data representing a color expressed in a first color system as a combination of tones in a color space of at least two dimensions, and said target table of interpolation stores colors expressed in a second color system that is different from said first color system, at the respective lattice points.

* * * * *